United States Patent [19]

Matsuda

[11] Patent Number: 5,126,942

[45] Date of Patent: Jun. 30, 1992

[54] CONTROL SYSTEM FOR CONTROLLING DRIVING POWER DISTRIBUTION FOR FOUR WHEEL DRIVE AUTOMOTIVE VEHICLE WITH FEATURE OF AVOIDANCE OF INFLUENCE OF WHEEL SPEED DATA FLUCTUATION

[75] Inventor: Toshiro Matsuda, Kanagawa, Japan

[73] Assignee: Nissan Motor Company, Limited, Yokohama, Japan

[21] Appl. No.: 465,728

[22] Filed: Jan. 18, 1990

[30] Foreign Application Priority Data

Jan. 24, 1989 [JP] Japan .................................. 1-14486

[51] Int. Cl.⁵ .................................................. B60T 8/32
[52] U.S. Cl. ................................ 364/426.02; 180/197
[58] Field of Search ................... 364/426.02, 426.03, 364/565, 424.1; 180/197, 233, 248, 249

[56] References Cited

U.S. PATENT DOCUMENTS

| 4,849,891 | 7/1989 | Krohn et al. | 364/426.03 |
| 4,866,624 | 9/1989 | Nishikawa et al. | 364/426.03 |
| 4,937,750 | 6/1990 | Gilliam | 364/426.03 |
| 4,962,455 | 10/1990 | Ishikawa et al. | 364/426.02 |
| 4,970,649 | 11/1990 | Matsuda | 364/426.02 |
| 4,991,678 | 2/1991 | Furuya et al. | 180/197 |

FOREIGN PATENT DOCUMENTS

3928903A1  4/1990  Fed. Rep. of Germany .

*Primary Examiner*—Gary Chin
*Attorney, Agent, or Firm*—Foley & Lardner

[57] ABSTRACT

A power distribution control system for an automotive vehicle, takes an approach for projecting vehicle speed representative value on the basis of a wheel speed latched immediately before initiation of wheel speed variation irrespective of the vehicle speed, and a predetermined variation rate of the vehicle speed. The vehicle speed representative value is derived as a function of time by taking the latched wheel speed as an initial value. The projected vehicle speed data is utilized with other preselected power distribution control parameters for controlling distribution ratio of driving power for a primary and a subsidiary driving wheels.

17 Claims, 14 Drawing Sheets

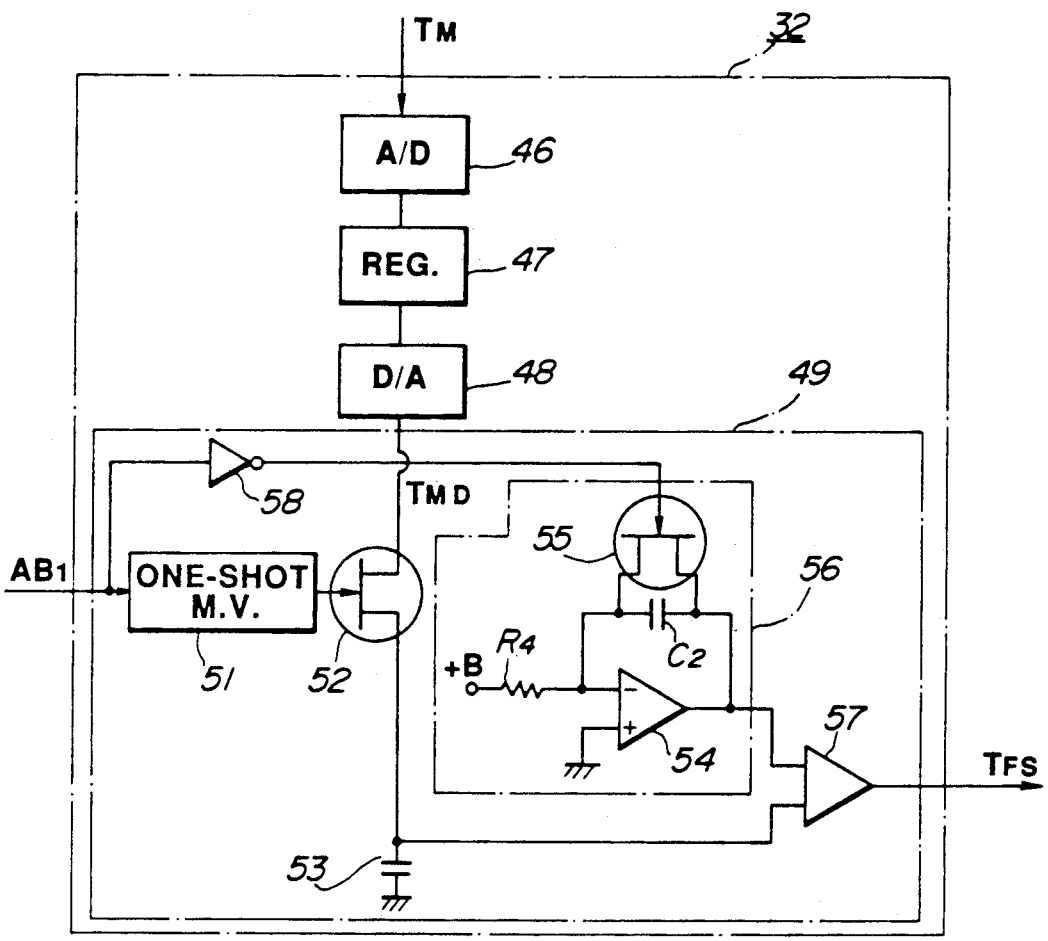
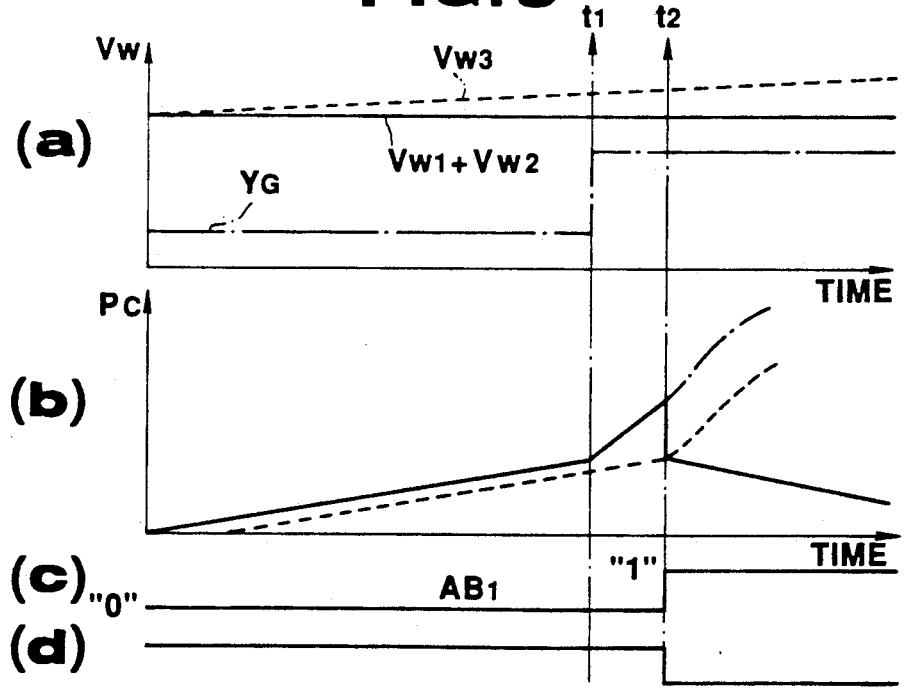

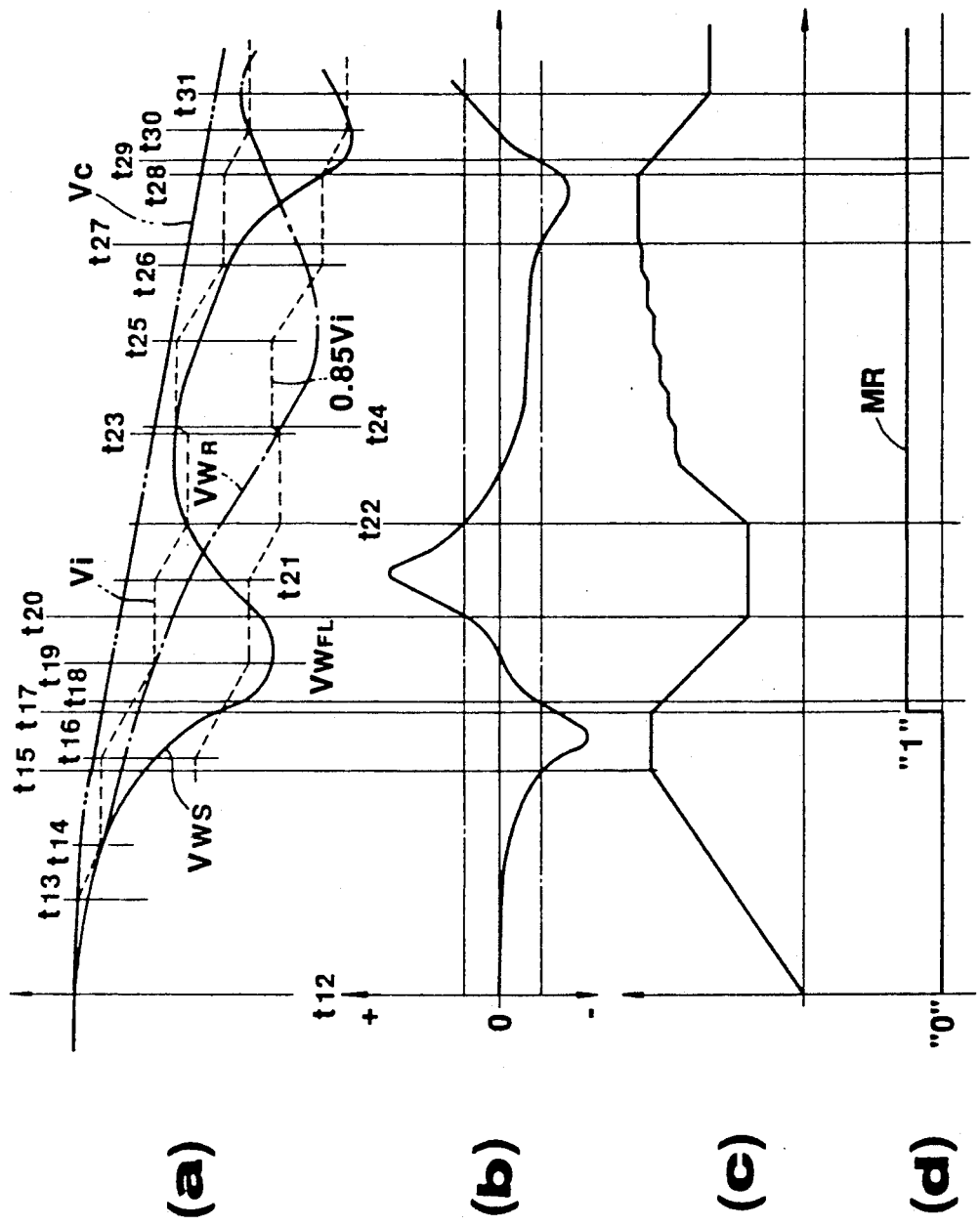

CONTROL SYSTEM FOR CONTROLLING DRIVING POWER DISTRIBUTION FOR FOUR WHEEL DRIVE AUTOMOTIVE VEHICLE WITH FEATURE OF AVOIDANCE OF INFLUENCE OF WHEEL SPEED DATA FLUCTUATION

BACKGROUND OF THE INVENTION

1. Field of the Invention

The present invention relates generally to a control system for an automotive vehicle having a four wheel driving power train layout. More specifically, the invention relates to a driving power distribution control system for a four wheel drive vehicle which assures precise control of power distribution corresponding to vehicle driving condition and is successful in avoiding influence any variation in the wheel speed.

2. Description of the Background Art

Japanese Patent First (unexamined) Publication (Tokkai) Showa 62-31529 which has been owned by the common owner to the present invention, discloses a power distribution control system for a four wheel drive automotive vehicle. The disclosed system includes wheel speed sensors respectively monitoring rotation speeds of a primary and a subsidiary driving wheels, a vehicle speed sensor for monitoring vehicle traveling speed, and a steering angle sensor for monitoring steering angular displacement. The control system detects vehicle driving condition on the basis of primary and subsidiary driving wheel speed, vehicle speed, steering angular displacement and so forth for adjusting driving power distribution ratio for the primary and the subsidiary driving wheels. With such prior proposed driving power distribution control systems, power distribution for the primary and subsidiary driving wheels can be well adjusted so as to provide satisfactorily high vehicle driving performance and stability.

On the other hand, in the modern and advanced automotive vehicles, various electronic or electric control systems are facilitated for respectively independent or associated control operations for various components of the vehicle. A typical and trendy control to be facilitated for the automotive vehicle is wheel slippage dependent acceleration and/or deceleration control, such as traction control, anti-skid brake control and so forth. In such wheel slippage dependent control, wheel speed is controlled so as to maintain optimal level of road/tire traction for vehicular acceleration and deceleration. Therefore, when wheel slippage dependent control is active, wheel speed can cyclically or periodically vary irrespective of a vehicle speed.

When such wheel slippage dependent control is coupled with the power distribution control, a difficulty is therefore encountered in obtaining vehicle speed data. Namely, it is a typical way for obtaining vehicle speed data on the basis of the wheel speed data since the wheel speed data normally reflects vehicle traveling speed. Further, the vehicle speed data is typically monitored by monitoring the average rotation speed of rear wheels. In such a method of monitoring the vehicle speed, the vehicle speed data obtained through the average rotation speed of the rear wheels may be inaccurate when the wheel speed is adjusted for better traction by the wheel slippage dependent control.

SUMMARY OF THE INVENTION

Therefore, it is an object of the present invention to provide a power distribution control system which can avoid the influence of variation or fluctuation of wheel speed data in controlling driving power distribution.

In order to accomplish aforementioned and other objects, a power distribution control system for an automotive vehicle, according to the present invention, takes an approach for projecting vehicle speed representative value on the basis of the wheel speed latched immediately before initiation of wheel speed variation irrespective of the vehicle speed, and a predetermined variation rate of the vehicle speed. The vehicle speed representative value is derived as a function of time by taking the latched wheel speed as an initial value. The projected vehicle speed data is utilized with other preselected power distribution control parameters for controlling distribution ratio of driving power for the primary and the subsidiary driving wheels.

According to one aspect of the invention, a power distribution control system for an automotive vehicle, is comprised of:

a power train connected to an automotive internal combustion engine, a primary driving wheel and a subsidiary driving wheel, the power train including a transfer unit constantly connecting the engine to the primary driving wheel for constantly distributing driving power to the primary driving wheel and selectively connecting and disconnecting the engine to the subsidiary driving wheel for distributing controlled ratio of driving power to the subsidiary driving wheel, the transfer unit having means for adjusting power distribution ratio for the subsidiary driving wheel;

a first sensor, associated with the primary driving wheel, for monitoring rotation speed of the primary driving wheel for producing a primary driving wheel speed indicative signal indicative thereof;

a second sensor, associated with the subsidiary driving wheel, for monitoring rotation speed of the subsidiary driving wheel for producing a subsidiary driving wheel speed indicative signal indicative thereof;

a vehicle speed data generator for monitoring a preselected parameter reflecting traveling speed of a vehicle body, and latching an instantaneous preselected parameter value at a predetermined vehicle driving condition as an initial vehicle speed representative data and modifying the initial vehicle speed representative data at a predetermined variation rate for deriving vehicle speed data; and a controller, receiving the primary wheel speed driving wheel speed indicative signal, the subsidiary driving wheel indicative signal and the vehicle speed representative data, for deriving a power distribution ratio on the basis thereof for controlling the power distribution adjustor of the transfer unit for adjusting power distribution for the primary driving wheel and the subsidiary driving wheel adapting to a vehicle driving condition.

In the preferred construction, the controller may derive a first power distribution ratio on the basis of the primary and subsidiary driving wheel speed indicative signals and a second power distribution ratio on the basis of the vehicle speed representative data, the controller deriving a power distribution control signal for controlling the power distribution adjustor of the transfer unit on the basis of one of the first and second power distribution ratios. In such case, the controller may compare the first and second power distribution ratios for selecting greater one for deriving the power distribution control signal.

On the other hand, the vehicle speed representative data generator may be connected to the first and second sensors for receiving the primary and subsidiary driving wheel speed indicative signals as the vehicular traveling speed reflecting parameters, and selecting one of the primary and subsidiary driving wheel speed indicative signals depending upon the vehicle driving condition for latching the selected one of the primary and subsidiary driving wheel speed indicative signals as the initial vehicle speed representative data. In operation, the vehicle speed data generator may detect the selected one of primary and subsidiary driving wheel speed indicative signals representing variation of wheel speed irrespective of vehicle speed for latching the instantaneous value of the selected one of the primary and subsidiary driving wheel speed indicative signal immediately before the occurrence of wheel speed variation irrespective of the vehicle speed. Further, the vehicle speed data generator may select one of the primary and subsidiary driving wheel indicative signals having a greater value than the other while the variation of wheel speed at the primary and subsidiary driving wheel substantially in coincidence with variation of the vehicle speed and selects one of the primary and subsidiary driving wheel speed indicative signals having smaller value than the other while variation of the wheel speed at the primary and subsidiary driving wheel is irrelative to variation of the vehicle speed.

Preferably, the power distribution control system further comprises a third sensor for monitoring longitudinal acceleration exerted on the vehicle to produce a longitudinal acceleration indicative signal, and the vehicle speed representative data generator integrates the longitudinal acceleration indicative signal value for modifying the initial vehicle speed representative data with an integrated value. In such case, the vehicle speed representative data generator may include an off-set means for providing a predetermined off-set for the longitudinal acceleration indicative signal.

The power distribution control system may further comprise a fourth sensor for monitoring lateral acceleration exerted on the vehicle body for producing a lateral acceleration indicative signal, and the controller modifies the power distribution ratio for reducing distribution ratio for the subsidiary driving wheel in a ratio variable depending upon the lateral acceleration indicative signal value. In such case, the controller includes a first device for receiving a lateral acceleration indicative signal output from the lateral acceleration sensor and a longitudinal acceleration indicative signal output from the longitudinal acceleration sensor for deriving a data value based on both of the lateral acceleration indicative signal and the longitudinal acceleration indicative signal; and second device for comparing the data value with a predetermined reference value for detecting faulty state of one of the lateral and longitudinal acceleration sensors for producing a faulty state indication signal.

According to another aspect of the invention, a power distribution control system for an automotive vehicle including a power train connected to an automotive internal combustion engine, a primary driving wheel and a subsidiary driving wheel, the power train including a transfer unit constantly connecting the engine to the primary driving wheel for constantly distributing driving power to the primary driving wheel and selectively connecting and disconnecting the engine to the subsidiary driving wheel for distributing controlled ratio of driving power to the subsidiary driving wheel, the transfer unit having a device for adjusting power distribution ratio for the subsidiary driving wheel, and a controller for deriving a power distribution ratio on the basis thereof for controlling the power distribution adjustor of the transfer unit for adjusting power distribution for the primary driving wheel and the subsidiary driving wheel adapting to a vehicle driving condition defined by a primary driving wheel speed, a subsidiary driving wheel speed and a vehicle speed representative data, wherein a system for generating the vehicle speed representative data is comprised of:

a first sensor, associated with the primary driving wheel, for monitoring rotation speed of the primary driving wheel for producing a primary driving wheel speed indicative signal indicative thereof;

a second sensor, associated with the subsidiary driving wheel, for monitoring rotation speed of the subsidiary driving wheel for producing a subsidiary driving wheel speed indicative signal indicative thereof;

a vehicle speed data generating means for generating the vehicle speed representative data, which includes a:

first device for receiving the primary and subsidiary driving wheel speed indicative signals and selecting one of the primary and subsidiary driving wheel speed indicative signals according to the vehicle driving condition, second device for monitoring variation of selected one of the primary and subsidiary driving wheel speed indicative signals for detecting a timing for latching an instantaneous value of selected one of the primary and subsidiary driving wheel speed indicative signals at a predetermined timing, and setting latched instantaneous value as an initial vehicle speed representative data, the second device updating the initial vehicle speed representative data every occurrence of the predetermined timing; and third device for modifying the vehicle speed representative data by a predetermined modification factor for deriving the vehicle speed representative data.

The third device may be set a predetermined gradient of variation of the vehicle speed representative data for deriving the modification factor as a function of elapsed time from the predetermined timing for deriving the vehicle speed representative data. Also, the vehicle speed representative data generating system may further comprise a third sensor for monitoring a longitudinal acceleration exerted on the vehicle to produce a longitudinal acceleration indicative signal, and the vehicle speed representative data generator integrates the longitudinal acceleration indicative signal value for modifying the initial vehicle speed representative data with an integrated value. In such case, the vehicle speed representative data generator may include an off-set means for providing a predetermined off-set for the longitudinal acceleration indicative signal.

According to a further aspect of the invention, a combination of a power distribution control system for an automotive vehicle, which includes a power train connected to an automotive internal combustion engine, a primary driving wheel and a subsidiary driving wheel, the power train including a transfer unit constantly connecting the engine to the primary driving wheel for constantly distributing driving power to the primary driving wheel and selectively connecting and disconnecting the engine to the subsidiary driving wheel for distributing controlled ratio of driving power to the subsidiary driving wheel, the transfer unit having a device for adjusting power distribution ratio for the subsidiary driving wheel, and a controller for controlling the power distribution adjustor in the transfer unit on the basis of primary and subsidiary driving wheel speed and a vehicle speed representative data; and a wheel slip control system which monitors wheel slippage derived on the basis of at least one of the primary and subsidiary driving wheel speed and the vehicle speed representative data, for adjusting force applied to the primary and subsidiary driving wheels for maintaining the wheel slippage at a predetermined optimal level, wherein the power distribution control system is comprised of:

a first sensor, associated with the primary driving wheel, for monitoring rotation speed of the primary driving wheel for producing a primary driving wheel speed indicative signal indicative thereof;

a second sensor, associated with the subsidiary driving wheel, for monitoring rotation speed of the subsidiary driving wheel for producing a subsidiary driving wheel speed indicative signal indicative thereof;

a vehicle speed data generator for monitoring a preselected parameter reflecting traveling speed of a vehicle body, and latching an instantaneous preselected parameter value in response to a predetermined operational state of the wheel slip control system as an initial vehicle speed representative data and modifying the initial vehicle speed representative data at a predetermined variation rate for deriving vehicle speed data; and a controller, receiving the primary wheel speed driving wheel speed indicative signal, the subsidiary driving wheel indicative signal and the vehicle speed representative data, for deriving a power distribution ratio on the basis thereof for controlling the power distribution adjustor of the transfer unit for adjusting power distribution for the primary driving wheel and the subsidiary driving wheel adapting to a vehicle driving condition.

The vehicle speed data generator may select one of the primary and subsidiary driving wheel indicative signals having greater value than the other while the wheel slip control system is not in active state and select one of the primary and subsidiary driving wheel speed indicative signals having smaller value than the other while the wheel slip control system is in active state.

In addition, the wheel slip control system may comprise an anti-skid brake control system for controlling braking force to be exerted on the primary and subsidiary driving wheels.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIG. 8 is a block diagram of engaging force control circuit for controlling power distribution for front and rear wheels;

FIG. 9 is a timing chart showing operation of the preferred embodiment of the automotive activity control system of FIG. 2;

FIG. 20 is a timing chart showing operation of the anti-skid brake control system in the automotive activity control system of FIG. 2.

DESCRIPTION OF THE PREFERRED EMBODIMENTS

Figure 1:
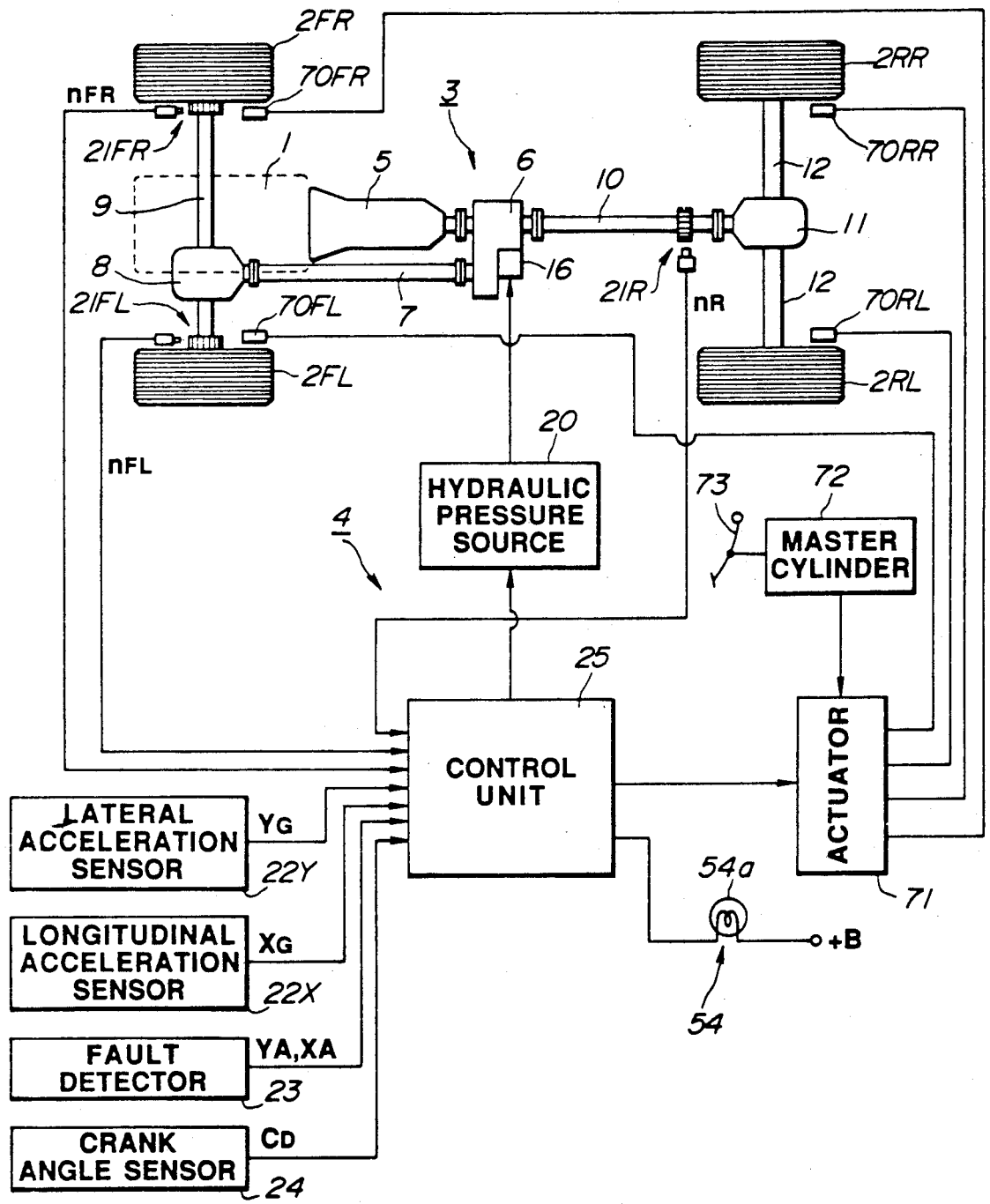
FIG. 1 is a schematic and brief block diagram of the preferred embodiment of an automotive activity control system according to the invention, which includes a power distribution control system and an anti-skid brake control system.

Referring now to the drawings, particularly to FIG. 1, the preferred embodiment of an automotive activity control system, according to the present invention, is applied for an automotive vehicle having four-wheel drive power train layout. The vehicle employs an automotive internal combustion engine 1 as a power plant. The vehicle has front-left, front-right, rear-left and rear-right wheels 2FL, 2FR, 2RL and 2RR respectively serving as driving wheels and thus driven by driving torque of the engine 1 supplied via a power train 3. In the shown embodiment, the rear wheels 2RL and 2RR serve as primary driving wheels for which the engine driving torque is constantly supplied and the front wheels 2FL and 2FR serve as subsidiary driving wheels which is selectively connected and disconnected to the engine 1 via the power train so that controlled proportion of driving torque is supplied. The power train 3 is associated with a power distribution control system 4.

The power train 3 comprises a power transmission 5 for transmitting the engine output torque with a selected gear ratio, a transfer unit 6 for splitting the engine output torque and selectively distributing the engine output torque for selective front-left and front-right wheels 2FL and 2FR and for normally driven rear wheels 2RL and 2RR. The transfer unit 6 has a front side output shaft 7 connected to a front differential gear unit 8 and thus transmits the engine output torque via a front drive axle 9. On the other hand, the transfer unit 6 is connected to the rear wheels 2RL and 2RR via a rear side output shaft as a propeller shaft 10, a rear differential gear unit 11 and rear drive axle 12.

Figure 2:
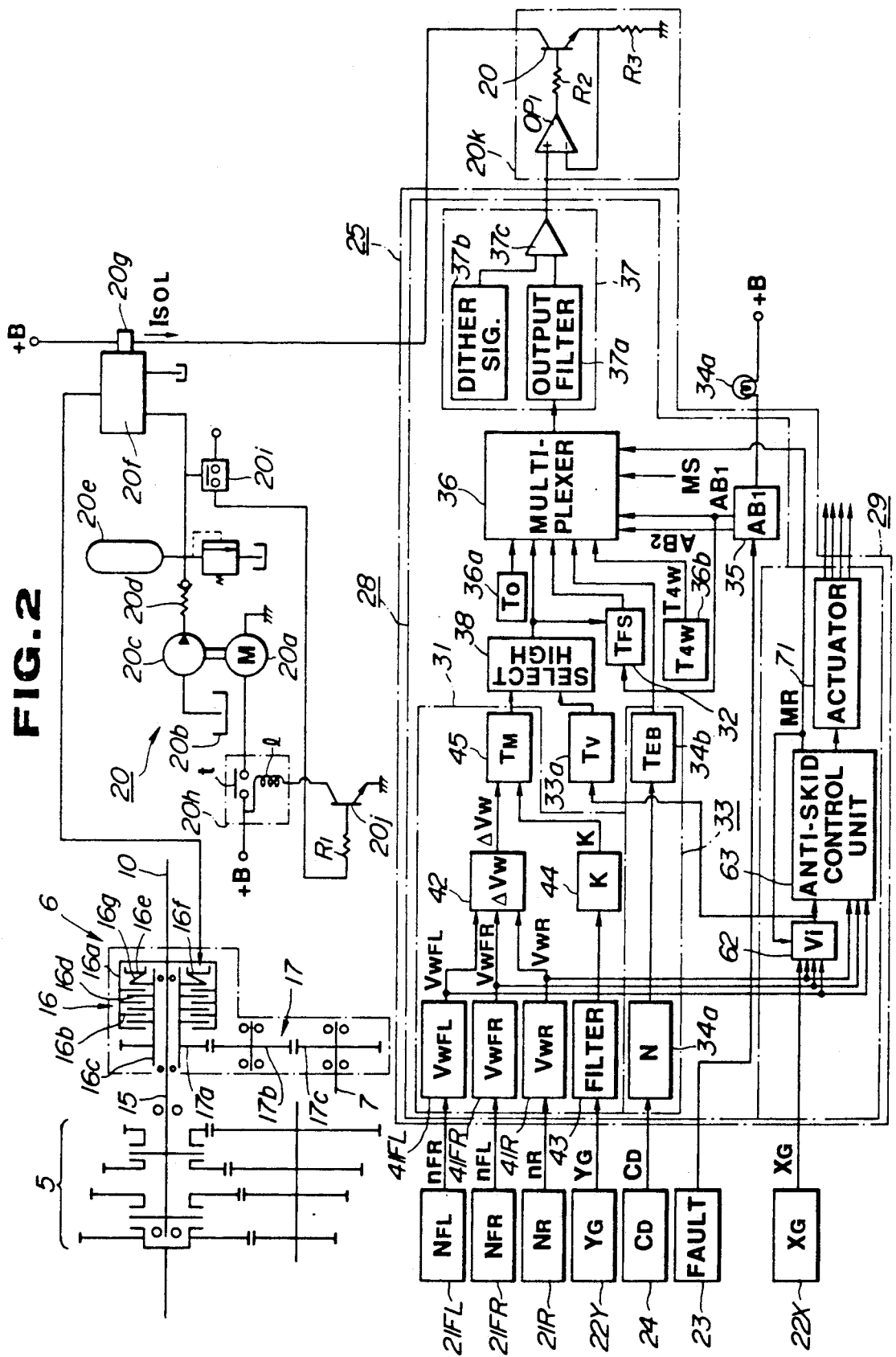
FIG. 2 is a block diagram of the automotive activity control system of FIG. 1.

As briefly shown in a form of skelton diagram in FIG. 2, the transfer unit 6 has an input shaft 15 connected to the output shaft of the transmission 5 at one end and to the propeller shaft 10 at the other end. The transfer unit 6 has a wet-type multi-plate clutch assembly 16 which is engaged and disengaged by clutch control pressure Pc supplied from a hydraulic pressure source 20. A gear train 17 is provided between the clutch assembly 16 and the front side output shaft 7 for transmitting part of the driving torque therethrough. The clutch assembly 16 has a clutch drum 16a splined to the input shaft 15 for rotation therewith. A friction plate 16b is integrally coupled with the clutch drum 16a. The clutch assembly 16 also includes a clutch hub 16c rotatable about a needle bearing 17. The clutch hub 16c is rigidly coupled with friction plate 16d. A clutch piston 16e is associated with a cylinder chamber 16f which is defined between the clutch piston and the clutch drum. The clutch piston 16e is normally subject to resilient bias force through a return spring 16g. The gear train 17 has an input gear 17a which is splined with the clutch hub 16c for rotation therewith, an intermediate gear 17b engaged to the input gear 17a and to an output gear 17c rigidly coupled with the front side output shaft 7 for drivingly rotate the latter.

While the operating pressure in the cylinder chamber 16f is maintained at zero, the friction plate 16d is held away from the friction plate 16b to maintain the clutch in a disengaged state. Therefore, all of the driving torque transferred to the input shaft 15 is transferred to the propeller shaft 10 and thus used for driving the rear wheels 2RL and 2RR. Therefore, at this time, the vehicle is driven in a rear-wheel drive mode. On the other hand, by supplying a control pressure into the cylinder chamber 16f, the clutch piston 16e is shifted to the position where balance of the pressure in the cylinder chamber and the return spring 16g is established. By this, the clutch piston 16e drives the friction plate 16d toward the friction plate 16b with a depression force which is a variable depending upon the control pressure supplied to the cylinder chamber 16f. Therefore, the magnitude of frictional engagement between the friction plates 16b and 16d is determined by the control pressure supplied to the cylinder chamber 16f. At this condition, part of the driving torque is distributed to the front side output shaft 7 via the gear train 17. Here, the magnitude of driving torque to be distributed to the front wheels which will be hereafter referred to as "front wheel" driving torque, $\Delta T$, and can be derived from:

$$\Delta T = P \cdot S \cdot 2n \cdot \mu \times rm$$

where
P: hydraulic pressure
S: effective area of the clutch piston 16c;
n: number of friction plates;
$\mu$: friction coefficient of friction plates; and
rm: effective radius of friction plate.

Figure 3:
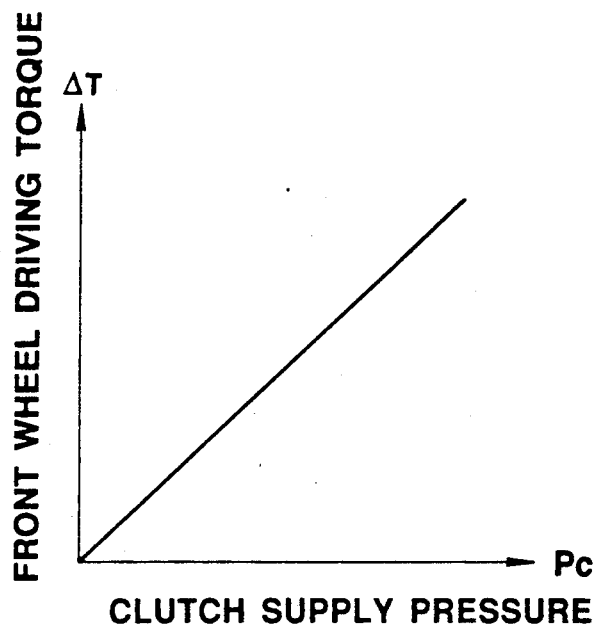
FIG. 3 is a graph showing characteristics of variation of front wheel driving torque in relation to clutch supply pressure.

As shown in FIG. 3, the front wheel driving torque $\Delta T$ is proportional to the control pressure Pc. Therefore, the torque distribution between front wheels 2FL and 2FR and rear wheels 2RL and 2RR is variable in a range of power distribution between 0:100 to 50:50 depending upon the engaging force to be exerted on the clutch assembly 16.

The power distribution control system 4 includes the hydraulic pressure source 20 for supplying the control pressure Pc, front-left, front-right and rear wheel speed sensors 21FL, 21FR and 21R for monitoring rotation speeds of respective of front-left and front-right wheels 2FL and 2FR and the average rotation speed of the rear-left and rear-right wheels 2RL and 2RR, a lateral acceleration sensor 22Y and a longitudinal acceleration sensor 22X for monitoring lateral and longitudinal accelerations exerted on the vehicular body, and a crank angle sensor 24 for monitoring crankshaft angular position to produce a crank reference signal and crank position signal. Here, since the crank angle sensor 24 is designed to produce the crank reference signal and the crank position signal, both of which have frequencies proportional to the engine revolution speed. In the shown embodiment of the automotive activity control system, the crank angle sensor is employed for providing an engine speed representative data. Therefore, either of crank reference signal or crank position signal can be used as a parameter based on which the engine speed data is derived. Therefore, the output signal of the crank angle sensor which is used for derivation of the engine speed will be hereafter referred to as "engine speed indicative signal $C_D$". The power distribution control system 4 further includes a fault detector 23 which monitors activities of the lateral and longitudinal acceleration sensors 22Y and 22X for detecting failure of either of the lateral and longitudinal acceleration sensors 22Y and 22X. The power distribution control system 4 further includes a microprocessor-based control unit 25.

Figure 4:
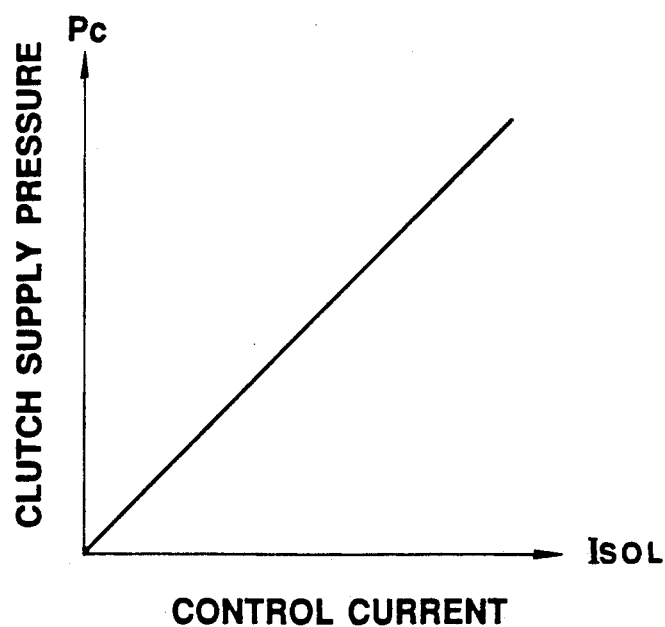
FIG. 4 is a graph showing characteristics of clutch supply pressure in relation to control current.

As shown in FIG. 2, the hydraulic pressure source 20 includes an electric motor 20a associated with an oil pump 20c for pressurizing working oil in a reservoir tank 20b for circulation through the transfer clutch assembly 16. A one-way check valve 20d is provided in a supply line downstream of the oil pump 20c. An accumulator 20e is connected to the supply line at an orientation downstream of the one-way check valve 20d and upstream of the clutch assembly 16. Also, a pressure control valve 20f with a proportioning solenoid 20g is also disposed between the accumulator 20e and the clutch assembly 16. The proportioning solenoid 20g is responsive to a control current $I_{SOL}$ supplied from the control unit 25 for controlling valve position of the pressure control valve 20f and thereby adjusting the control pressure Pc to be supplied to the cylinder chamber 16f. As can be seen from FIG. 4, the control pressure Pc varies in linear fashion proportional to the control current $I_{SOL}$.

The electric motor 20a has an electromagnetic winding connected to a positive power source +B via motor relay 20h at one end. The other end of the electromagnetic winding of the electric motor 20a is connected to the ground level. The motor relay 20h is controlled by the switch position depending upon the line pressure at the orientation between the accumulator 20e and the pressure control valve, as monitored by means of a pressure switch 20i. In the shown construction, the pressure switch 20i is connected to the base electrode of a switching transistor 20j via a resistor $R_1$. The collector electrode of the transistor 20j is connected to the positive power source +B and the emitter electrode is connected to the ground level. The pressure switch 20i is held OFF while the line pressure in the supply line is higher than a predetermined minimum pressure representative reference value and is turned ON in response to a drop below the reference value. In response to the turning ON of the pressure switch 20i, the transistor 20j is turned into a conductive state for establishing a ground circuit for the relay coil of the motor relay 20h. Therefore, the relay coil is energized to close a normally open contactor t of the relay to drive the electric motor 20a. By this, the oil pump 20c is driven to supply the pressurized working fluid to increase the pressure in the accumulator 20e and in the supply line. On the other hand, the proportioning solenoid 20g is connected to the positive power source +B at one end and to a solenoid driver circuit 20k at the other end. The solenoid driver circuit 20k has an operational amplifier $OP_1$ having a non-inverting input connected to the control unit 25 to receive therefrom a pressure control voltage signal Vc. The operational amplifier $OP_1$ has an output connected to the base electrode of a power transistor 20l via a resistor $R_2$. The power transistor 20l has the collector electrode connected to the solenoid 20g and the emitter connected to the ground level.

Figure 5:
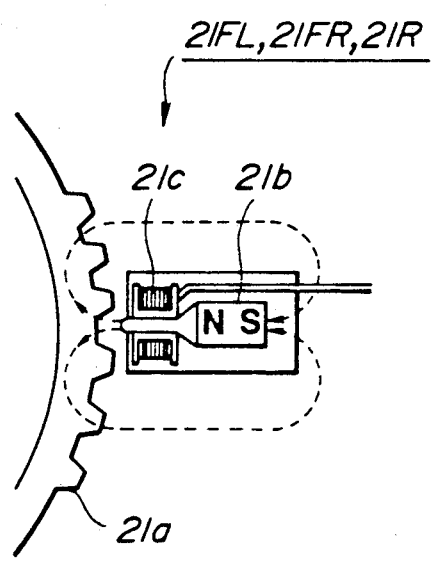
FIG. 5 is a brief and explanatory illustration of a wheel speed sensor to be employed in the automotive activity control system of FIGS. 1 and 2.

As shown in FIG. 5, each of the front-left, front-right and rear wheel speed sensors 21FL, 21FR and 21R is comprised of a rotor disc 21a with a plurality of circumferentially arranged projections, which rotor disc is rigidly coupled with front-left or front-right drive shaft or with the propeller shaft for rotation therewith, and a magnetic pick-up including a permanent magnet 21b and an induction coil 21c. The magnetic pick-up is so designed as to induce a sinusoidal frequency signal having a frequency proportional to the rotation speed of the rotor disc and thus proportional to the rotation speed of the associated drive shaft or propeller shaft.

The lateral acceleration sensor 22Y is generally designed for monitoring lateral acceleration exerted on the vehicular body to generate a lateral acceleration indicative signal $Y_G$ to be input to the control unit 25. On the other hand, the longitudinal acceleration sensor 22X is generally designed for monitoring the longitudinal acceleration exerted on the vehicular body for producing a longitudinal acceleration indicative signal $X_G$ to be provided for the control unit 25.

Figure 6:
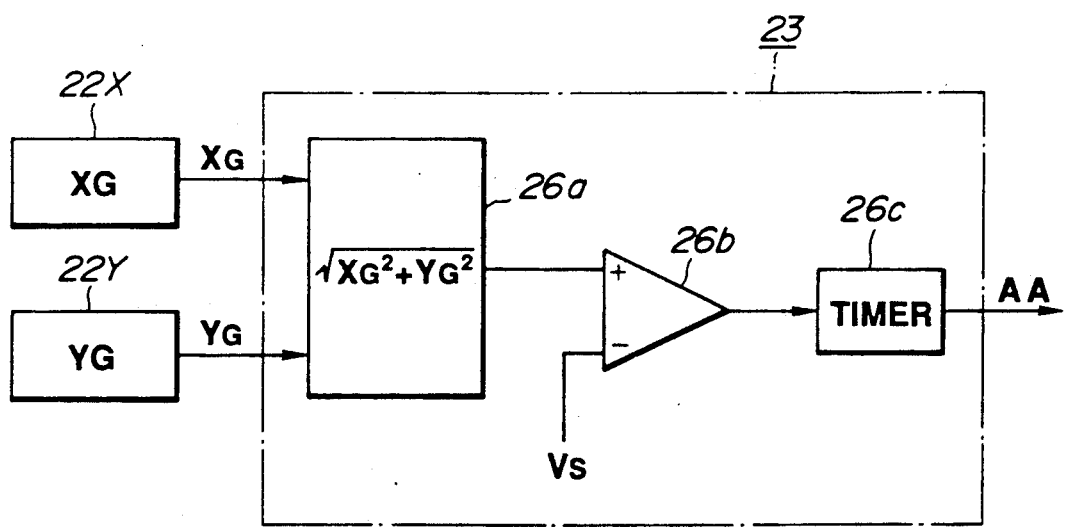
FIG. 6 is a block diagram of a fault detecting circuit in the automotive activity control system.

FIG. 6 shows the circuit construction of the fault detector 23. As seen, the fault detector 23 has an arithmetic circuit 26a which receives the lateral acceleration indicative signal $Y_G$ and the longitudinal acceleration indicative signal $X_G$ from the lateral and longitudinal acceleration sensors 22Y and 22X. The arithmetic circuit 26a performs arithmetic operation for deriving:

$$\sqrt{X_G^2 - Y_G^2}$$

The resultant value of the arithmetic operation is supplied to the non-inverting input terminal of a comparator 26b. The inverting input terminal of the comparator 26b is supplied a pre-set voltage Vs. The comparator 26b is responsive to the input from the arithmetic circuit 26a having the value greater than the pre-set value Vs and outputs HIGH level comparator signal. The output of the comparator 26b is supplied to a timer 26c which is designed to output a fault indicative signal AA when the input from the arithmetic circuit 26a is maintained at a value greater than the pre-set value Vs for a predetermined period of time, e.g. 0.5 sec.

In the shown embodiment, the pre-set value Vs is set at a critical acceleration, e.g. 1.2 g, corresponding to road/tire friction coefficient $\mu_{ROAD}$.

Figure 7:
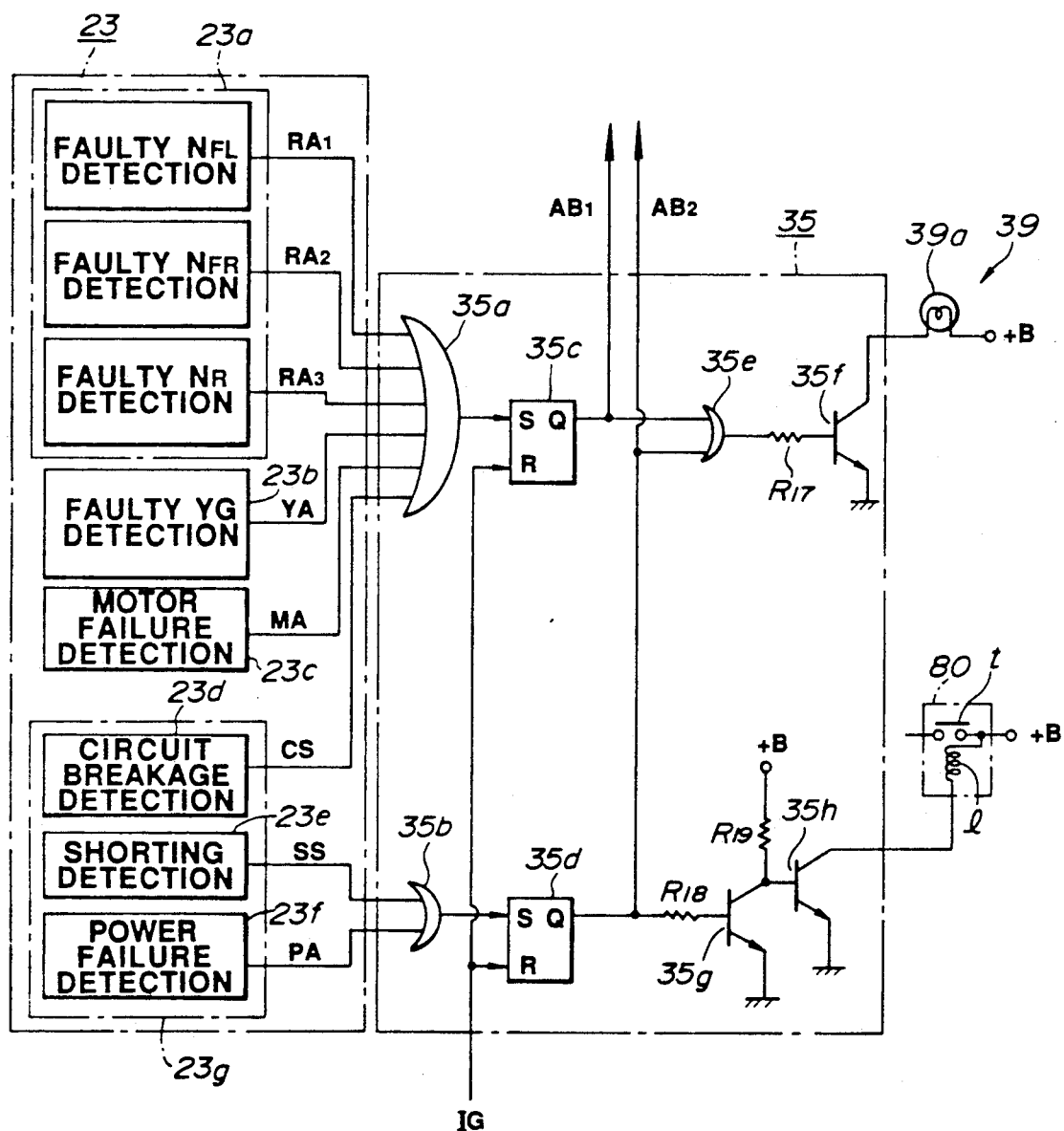
FIG. 7 is a block diagram of another embodiment of a fault detecting circuit applicable for the preferred embodiment of the automotive activity control system.

In the alternative, the fault detector 23 may also be constructed as illustrated in FIG. 7. The fault detector 23 includes wheel speed sensor failure detection circuit 23a which forms faulty $N_{FL}$, $N_{FR}$ and $N_R$ detecting sections respectively associated with the wheel speed sensors 21FL, 21FR and 21R. Respective faulty $N_{FL}$, $N_{FR}$ and $N_R$ detecting sections of the wheel speed sensor failure detection circuit 23a operate independently for monitoring outputs of respectively associated one of the wheel speed sensors 21FL, 21FR and 21R by detecting presence or absence of the outputs. When failure of the wheel speed sensor is detected and faulty condition of the wheel speed sensor is maintained for a predetermined period, e.g. 0.5 sec., the faulty $N_{FL}$, $N_{FR}$ and $N_R$ detecting sections of the wheel speed sensor failure detecting circuit 23a produce a faulty wheel speed sensor indicative signal $RA_1$, $RA_2$ and $RA_3$. The fault detector 23 also includes a lateral acceleration sensor failure detecting circuit 23b which is designed for detecting failure of the lateral acceleration sensor 22Y to produce a faulty lateral acceleration indicative signal $Y_A$. In practice, the lateral acceleration sensor failure detecting circuit 23b compares the lateral acceleration indicative signal $Y_G$ with a lateral acceleration threshold value $Y_S$ which is set at a value, e.g. 1.2 G which is not possibly exerted on the vehicle body in the normal condition. The lateral acceleration sensor failure detecting circuit 23b produces the faulty lateral acceleration sensor indicative signal $Y_A$ when the lateral acceleration indicative signal value $Y_G$ is maintained at a greater value than the lateral acceleration threshold $Y_S$ for a given period of time, e.g. 0.5 sec.

A motor failure detecting circuit 23c is further provided in the fault detector 23. The motor failure detecting circuit 23c is designed for detecting abnormality of the motor 20a in the hydraulic pressure source unit 20, the pump 20c, the motor relay 20h and so forth for detecting faulty motor indicative signal $M_A$ when the abnormality in the motor 20a, the pump 20c and the motor relay is maintained for a period over the predetermine period. In addition, the fault detector circuit 23 is provided with a circuit abnormality detecting circuit 23g. The circuit abnormality detecting circuit 23g includes a circuit breakage detecting section 23d, a shorting detecting section 23e and a power failure detecting section 23f. In the shown embodiment, the circuit breakage detecting section 23d is designed for principally detecting the breakage of circuit in the solenoid 20g. The circuit breakage detecting section 23d produces a circuit breakage indicative signal $C_S$ when the circuit breakage is maintained for the given period, e.g. 0.5 sec. Also, the shorting detecting section 23e principally monitors circuit condition in the solenoid 20g. The shorting detecting section 23e producing a circuit shorting indicative signal $S_S$ when circuit shorting is maintained for a period longer than the predetermined period, e.g. 0.5 sec. The power failure detecting section 23f further includes a monitoring power supply for the solenoid to detect failure of power supply for the solenoid 20g. If power failure is maintained for a period longer than the predetermined period, e.g. 0.5 sec, the power failure detecting circuit 23f produces a power failure indicative signal $P_4$. Respective wheel speed sensor failure detecting circuit 23a, the lateral acceleration sensor failure detecting circuit 23b, the motor failure detecting circuit 23c, the circuit failure detecting circuit 23g are connected to a fail-safe circuit which will be discussed later so as to supply the faulty $N_{FL}$, $N_{FR}$ and $N_R$ indicative signal $RA_1$, $RA_2$ and $RA_3$, the faulty lateral acceleration sensor indicative signal $Y_A$, the motor failure indicative signal $M_A$, the circuit breakage indicative signal $C_S$, the circuit shorting indicative signal $S_S$ and the power failure indicative signal $P_4$, as a fault detection signal AA.

The control unit 25 comprises a power distribution control section 28 and an anti-skid brake control section 29.

The power distribution control section 28 has a power distribution deriving circuit 31 for deriving an engaging force $T_M$ of the clutch assembly 16 and thereby deriving power distribution between the front and rear wheels. The power distribution control section 28 also includes an engaging force reduction magnitude deriving circuit 32 which derives a magnitude of reduction of the engaging force $T_M$. The power distribution control section 28 further includes a vehicular speed dependent engaging force deriving circuit 33a which derives engaging force $T_I$ of the clutch assembly 16 on the basis of a projected vehicle speed representative data Vi which is derived by the anti-skid brake control section 29, the manner of derivation of which will be discussed later. The power distribution deriving circuit 31 and the vehicle speed dependent engaging force deriving circuit 33a are connected to a select HIGH circuit 38 for supplying an engaging force $T_M$ and $T_I$ indicative signals. The select HIGH circuit 38 compares the input engaging force $T_M$ and $T_I$ indicative signals for selecting the greater one for outputting a select HIGH output corresponding to the selected one of the engaging force indicative signals.

Also, the power distribution control section 28 has an engine speed dependent power distribution deriving circuit 34 for deriving the engaging force $T_{EB}$ on the basis of the engine speed indicative data Ve. A fail-safe circuit 35 is further provided in the power distribution control section 28. The fail-safe circuit 35 is responsive to the fault indicative signal AA from the fault detector 23 and connected to the engaging force reduction magnitude deriving circuit 32 and a multiplexer 36 which multiplexing the engaging force $T_M$ indicative signal of the power distribution deriving circuit 31, the engaging force $T_I$ indicative signal of the vehicle speed dependent engaging force deriving circuit 33a, the engaging force reducing magnitude $T_{FS}$ indicative signal of the engaging force reduction magnitude deriving circuit 32 and the engaging force $T_{EB}$ indicative signal of the engine speed dependent power distribution deriving circuit 34. To the multiplexer, a power distribution setting circuit 36a is connected to supply a set engaging force command ($T_O$ indicative signal) which is representative of zero engaging force. The multiplexer 36 further multiplexes an engaging force $T_{4H}$ indicative signal of a manually entered command responsive power distribution deriving circuit 36b, with the $T_{4H}$ indicative signal represents a clutch engaging force of 50 kg/m, for example.

The fail-safe circuit 35 feeds fail-safe command for the engaging force reduction magnitude deriving circuit 32 for requiring a predetermined fail-safe mode operation. As well, the fail-safe circuit 35 outputs the fail-safe command for the multiplexer 36 for switching operational mode of the latter to the fail-safe mode. Furthermore, the fail-safe circuit 35 outputs the fault indicative signal to an alarm circuit 39 which includes an alarm lamp 39a.

The multiplexer 36 is connected to a drive signal generator circuit 37 which is, which in turn, is connected to the solenoid driver circuit 20k for driving the solenoid 20g and whereby controls the control pressure Pc to be supplied to the pressure chamber 16f.

As shown in FIG. 2, the power distribution deriving circuit 31 has wheel speed deriving circuits $41_{FL}$, $41_{FR}$ and $41_R$ which is connected to the front-left, front-right and rear wheel speed sensors 21FL, 21FR and 21R for receiving respective wheel speed indicative signals $N_{FL}$, $N_{FR}$ and $N_R$ for deriving front-left, front-right and rear wheel speed indicative signals $Vw_{FL}$, $Vw_{FR}$ and $Vw_R$. The wheel speed derivation circuit $41_{FL}$, $41_{FR}$ and $41_R$ are connected to a wheel speed difference deriving circuit 42 which derives a wheel speed difference $\Delta Vw$ to produce a wheel speed difference $\Delta Vw$ indicative signal to be fed to an arithmetic circuit 45 of the power distribution deriving circuit 31, which arithmetic circuit 31 actually serves for deriving the engaging force TM. Practically, the wheel speed difference deriving circuit 42 performs arithmetic operations according to the following equation for deriving the wheel speed difference $\Delta Vw$.

$$\Delta Vw = 2Vw_R - Vw_{FL} - Vw_{FR}$$

The power distribution deriving circuit 31 is further provided with a filter means 43 connected to the lateral acceleration sensor 22Y for filtering the lateral acceleration indicative signal $Y_G$ and supplies to a coefficient generator circuit 44. The coefficient generator circuit 44 provides a gain K which corresponds to an inverse number of the lateral acceleration indicative signal $Y_G$ to the arithmetic circuit 45. The arithmetic circuit 45 performs arithmetic operation for deriving the $T_M$ indicative signal on the basis of the absolute value $|\Delta Vw|$ input from the wheel speed difference deriving circuit 42 and the gain K input from the coefficient generator circuit 44.

The engaging force reduction magnitude deriving circuit 32 includes an analog-to-digital (A/D) converter 46 for converting the analog form $T_M$ indicative signal into digital data representative of the demanded clutch engaging force. The converted $T_M$ indicative digital data is temporarily stored in a shift register 47 in order. The shift register 47 holds the $T_M$ indicative digital date for a predetermined period of time which may correspond to timer period of the timer 26c of the fault detecting circuit 23, and outputs the corresponding data immediately after expiration of the predetermined period. The output of the shift register 47 is subject to digital-to-analog (D/A) conversion performed by a D/A converter 48 and subsequently supplied to an arithmetic circuit 49. The arithmetic circuit 49 includes a field effect transistor (FET) 52 having its drain connected to the D/A converter 48. Gate of the FET 52 is connected to an one-shot multivibrator 51 which is, in turn, connected to the fail-safe circuit 35 to receive therefrom the fault indicative signals $AB_1$ and $AB_2$. The one-shot multivibrator 51 is responsive to the leading edge of the fault indicative signals $AB_1$ and $AB_2$ for generating a HIGH level gate input for making the FET 52 conductive. The source of the FET 52 is connected to the ground level via a charge capacitor 53.

The engaging force reduction magnitude derivation circuit 32 further includes an integration circuit 56 which has a FET 55 having the gate connected to the fail-safe circuit 35 via an inverter 58. Drain and source of the FET 55 are connected to both sides of a capacitor $C_2$. The integration circuit 56 further includes an operational amplifier 54 having an inverting input connected to a positive power source +B via a resistor $R_4$ and a non-inverting input terminal connected to the ground level. The engaging force reduction magnitude deriving circuit 32 further includes an adder 57 receiving the charge level of the capacitor 53 and the output of the integrator circuit 56 for outputting the $T_{FS}$ indicative signal.

The vehicle speed dependent engaging force deriving circuit $33a$ is connected to a vehicle speed representative data projecting circuit 62 in the anti-skid brake control section 28 which will be discussed in detail later, to receive therefrom the projected vehicle speed representative data Vi. The vehicle speed dependent engaging force deriving circuit $33a$ derives the engaging force $T_1$ on the basis of the projected vehicle speed representative data according to the characteristics illustrated in FIG. 10. The relationship between the projected vehicle speed representative data Vi and the engaging force $T_1$ may be expressed by the following equation (1):

$$T_1 = bV_i - c \quad (1)$$

Figure 11:
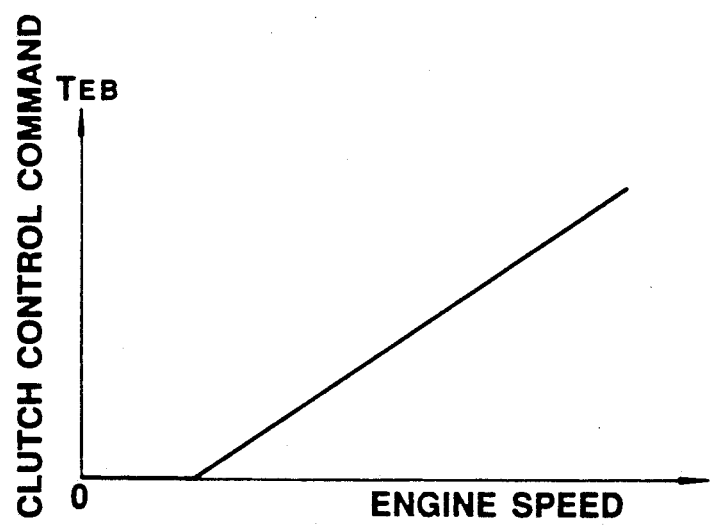
FIG. 11 is a chart showing relationship between a clutch control command $T_{EB}$ and an engine speed.

The engine speed dependent power distribution deriving circuit 33 includes an engine speed derivation circuit $33a$ which derives an engine speed indicative value Ve on the basis of the output signal of the crank angle sensor 24, i.e. crank reference signal or crank position signal. The engine speed derivation circuit $34a$ also serves for predicting engine braking magnitude. The engine speed dependent power distribution deriving circuit 34 further includes an arithmetic circuit $34b$ which derives the engine speed dependent clutch engaging force on the basis of the engine speed indicative data Ve according to the characteristics illustrated in FIG. 11. In practice, the arithmetic circuit $34b$ derives the clutch engaging force $T_{EB}$ at a value approximately half of the engine braking force, e.g. about 8 kg at the maximum. The relationship between the engine speed indicative data Ve and the engaging force $T_{EB}$ may be expressed by the following equation (2):

$$T_{EB} = dV_e - e \quad (2)$$

As shown in FIG. 7, the fail-safe circuit 35 is associated with the fail detector 23 for receiving various fault indicative signal as generally referred to as AA. The fail-safe circuit 35 includes an OR gate $35a$ which is connected to the wheel speed sensor failure detecting circuit $23a$, the lateral acceleration sensor failure detecting circuit $23b$, the motor failure detecting circuit $23c$ and the circuit breakage detecting section $23d$ of the circuit failure detecting circuit $23g$ for receiving respective failure indicative signals $RA_1$, $RA_2$, $RA_3$, $Y_4$, $M_4$ and $C_5$. The fail-safe circuit 35 has another OR gate $35b$ which is connected to the circuit shorting detecting section $23e$ and the power failure detecting section $23f$ of the circuit failure detecting circuit $23g$ to receive therefrom the failure indicative signals $S_5$ and $P_4$. The OR gate $35a$ is connected to a set input terminal of a flipflop $35c$. The flipflop $35c$ has a reset input terminal connected to the ignition switch to that it is reset by the leading edge of the HIGH level IG signal at ON set of the power supply. On the other hand, the output terminal of the OR gate $35b$ is connected to a set input terminal of another flipflop $35d$. Similar to the flipflop $35c$, the flipflop $35d$ has a reset input terminal connected to the ignition switch so that it is reset by the leading edge of the HIGH level IG signal at ON set of the power supply. The output terminals of the flipflops $35c$ and $35d$ are connected to the multiplexer 36 to supply the outputs $AB_1$ and $AB_2$.

The output terminal of the flipflop $35c$ is also connected to an OR gate $35e$ which is, which in turn, is connected to the base electrode of a switching transistor $35f$ via a resistor $R_{17}$. The OR gate has another input terminal connected to the output terminal of the output terminal of the flipflop $35d$ to receive therefrom the output $AB_2$. The switching transistor $35f$ has the collector electrode connected to the alarm circuit 39 including the alarm lamp $39a$. The emitter electrode of the switching transistor $35f$ is connected to the ground.

On the other hand, the output terminal of the flipflop $35d$ is further connected to the base electrode of a switching transistor $35g$ via a resistor $R_{18}$. The collector electrode of the switching transistor $35g$ is connected to a positive power source +B via a resistor $R_{19}$, and to the base electrode of a switching transistor $35h$. The emitter electrode of the switching transistor $35g$ is grounded. The switching transistor $35h$ has the collector electrode connected to a relay coil X of a solenoid relay circuit 80 which is disposed between the power source +B and the proportioning solenoid $20g$. The emitter electrode of the switching transistor $35h$ is connected to the ground.

Figure 12:
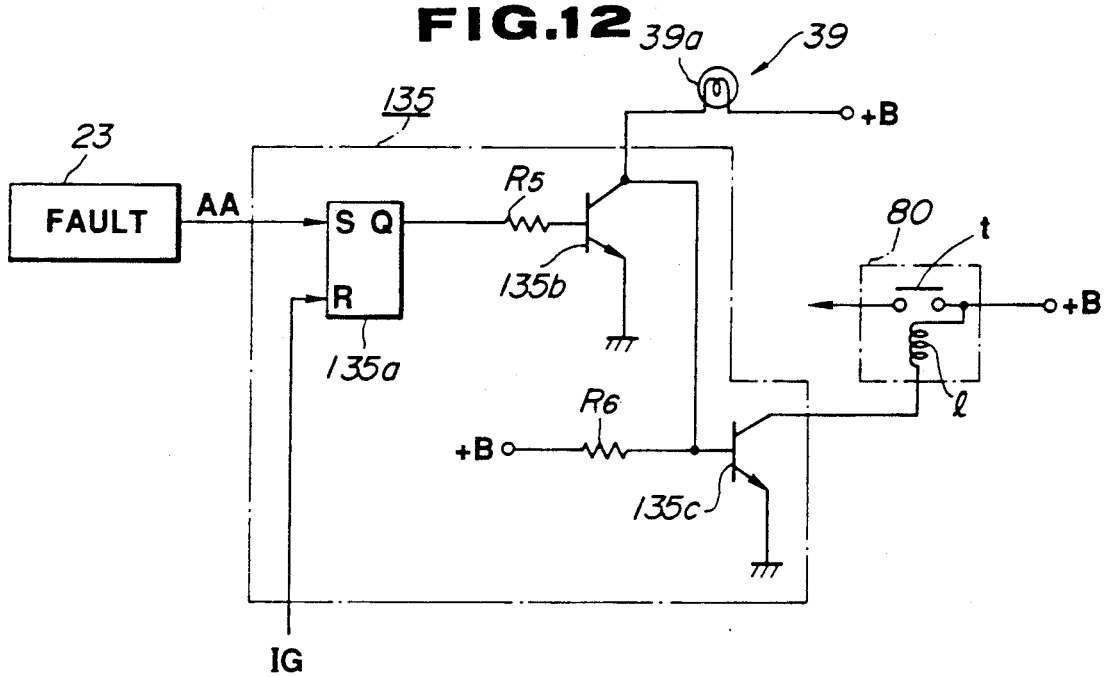
FIG. 12 is a block diagram of a fail-safe circuit employed in the activity control system of FIG. 2.

In the alternative, when the fault detector 23 is formulated as illustrated in FIG. 6, the fail-safe circuit 35 may comprise as illustrated in FIG. 12. In the construction shown in FIG. 12, the fail-safe circuit 35 receives the fault indicative signal AA from the fault detecting circuit 23 at a set input of a RS-flipflop $135a$. The reset input terminal of the flipflop $135a$ is connected to an ignition switch (not shown) to be reset in response to the leading edge of the ignition signal. The flipflop $135a$ has a Q output terminal connected to a base electrode of a switching transistor $135b$ via a resistor $R_5$. The collector electrode of the switching transistor $135b$ is connected to the alarm lamp $39a$ of the alarm circuit 39. On the other hand, the emitter electrode of the switching transistor $135b$ is connected to a ground level. The collector electrode of the transistor $135b$ is further connected to the positive power source +B via a resistor $R_6$. The base electrode of the switching transistor $135c$ is further connected to the positive power source +B via the resistor $R_6$. The collector electrode of the switching transistor $135c$ is connected to a relay coil l in an actuator relay 80, which is, in turn connected to the positive power source +B. The actuator relay 80 serves as the power supply switch for the anti-skid brake control section 29.

Though there is not clearly illustrated in FIG. 12, the Q output of the flipflop 135a serves as the fail-safe signal $AB_1$ and is supplied to the engaging force reduction magnitude deriving circuit 32 and the analog multiplexer 36.

As set forth, the multiplexer 36 receives the select HIGH output of the select HIGH circuit 38, which is the greater one of the $T_M$ indicative signal of the power distribution deriving circuit 45 and the $T_V$ indicative signal of the vehicle speed dependent engaging force deriving circuit 33a, the $T_{FS}$ indicative signal of the engaging force reduction magnitude deriving circuit 32, the $T_{EB}$ indicative signal of the engine speed dependent power distribution deriving circuit 34, the $T_O$ indicative signal of the power distribution setting circuit 36a, the $T_{4H}$ indicative signal of the power distribution deriving circuit 36b, the fault indicative signals $AB_1$ and $AB_2$ of the fault detector 35, and the manually entered power train mode selector command MS. The multiplexer 36 also receives an anti-skid control active state indicative signal which serves as a fluid pump driver signal MR. When all of these inputs are held LOW level, the multiplexer 36 selects the select HIGH output of the select HIGH circuit 38 so that greater one of the $T_M$ indicative signal of the power distribution deriving circuit 31 and the $T_V$ indicative signal of the vehicle speed dependent engaging force deriving circuit 33a is supplied to a drive signal generator circuit 37. If the fault indicative signals $AB_1$ and $AB_2$ are held at LOW level and the anti-skid control active state indicative signal MR is at HIGH level, the $T_{EB}$ indicative signal of the engine speed dependent power distribution deriving circuit 34 is selected by the multiplexer 36. On the other hand, if the fail-safe signal $AB_1$ is at HIGH level, the multiplexer 36 selects the $T_{FS}$ indicative signal of the engaging force reduction magnitude derivation circuit 32 to supply the $T_{FS}$ indicative signal to the drive signal generator circuit 37. If the manually entered power train mode selector command MS is held at HIGH level, the $T_{4H}$ indicative signal of the power distribution deriving circuit 36a is supplied to the drive signal generator circuit 37.

The drive signal generator circuit 37 includes an output filter 37a for filtering the input signal from the multiplexer 36 and feeding to an adder 37c. The adder 37c is also connected to a dither signal generator 37b to receive therefrom a dither output to add to the output from the multiplexer 36. The adder 37c thus output a driver signal $V_c$ in a form of voltage signal to the operational amplifier $OP_1$ of the solenoid drive circuit 20K.

As shown in FIG. 2, the anti-skid brake control section 29 receives the longitudinal acceleration indicative signal $X_G$ from the longitudinal acceleration sensor 22X. Also, the anti-skid brake control section 29 receives the front-left, front-right and rear wheel speed indicative signals $Vw_{FL}$, $Vw_{FR}$ and $Vw_R$ from the front-left, front-right and rear wheel speed deriving circuits 41FL, 41FR and 41R. The anti-skid brake control system includes a vehicle speed representative value Vi projecting circuit 62 and an anti-skid control unit 63 which controls actuator or pressure control valve unit 71 for adjusting fluid pressure built-up in front-left, front-right, rear-left and rear-right wheel cylinders 70FL, 70FR, 70RL and 70RR. It should be noted that though FIG. 2 shows only one pressure control valve unit 71 for uniform and mutually dependent skid control for all wheel cylinders, it is possible to provide the actuators for respective wheel cylinders in order to facilitate independent skid control operation per each wheel.

Figure 13:
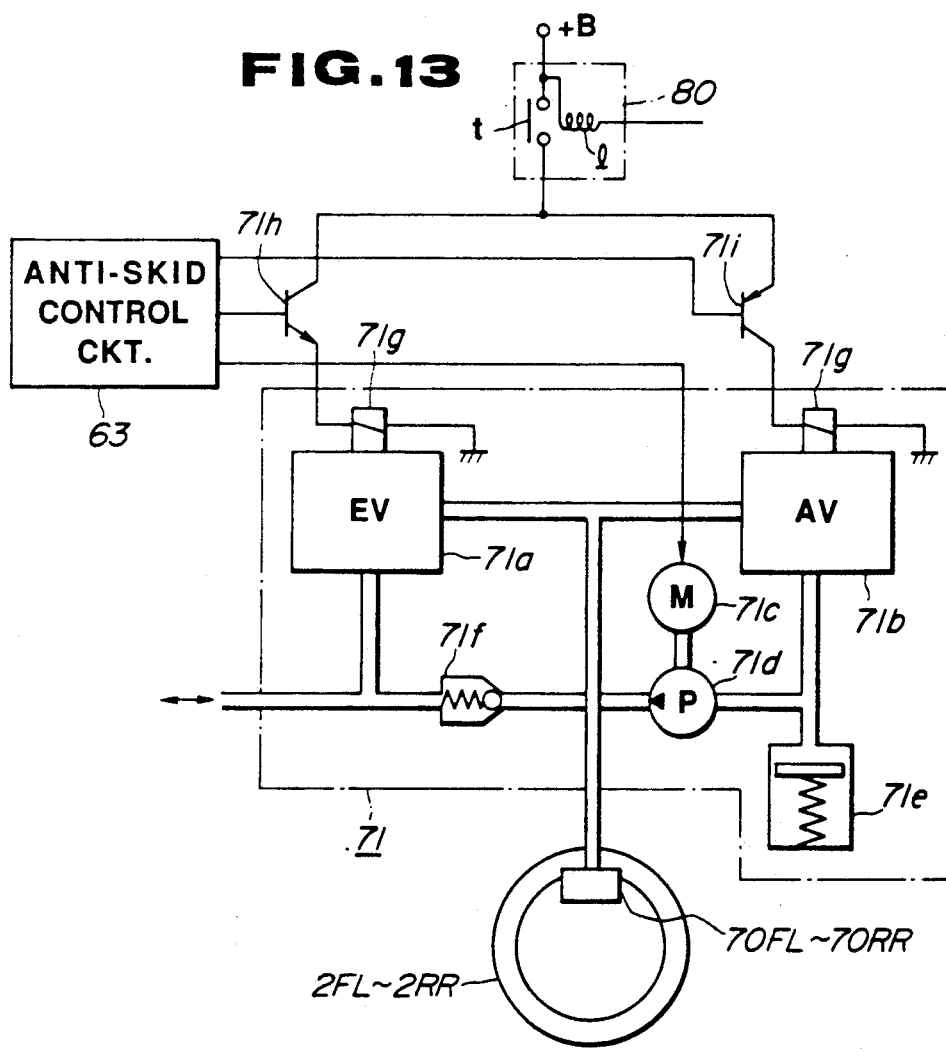
FIG. 13 is a block diagram of anti-skid brake control network employed in the automotive activity control system of FIG. 2.

FIG. 13 shows one example of the pressure control valve unit 71 which may be employed in the shown anti-skid brake control. As can be seen from FIG. 13, the pressure control valve unit 71 includes an inlet control (EV) valve 71a and an outlet control (AV) valve 71b. The pressure control valve unit 71 also includes a drain pump 71d driven by means of an electric motor 71c which is controlled by MR signal from the anti-skid control unit 63. The pressure control valve unit 71 has an inlet port connected to the master cylinder 72 to receive the working fluid pressure built up in the latter and an outlet port connected the wheel cylinder 70. The EV valve 71a is interposed between the inlet port and the outlet port for controlling introduction of the pressurized working fluid to the wheel cylinder 70. The AV valve 71b is connected to the outlet of the EV valve 71a, the outlet port at the inlet side and to the pressure accumulator 71e and the drain pump 71d. The discharge outlet drain pump 71d is connected to the inlet port via a one-way check valve 71f for returning part of working fluid in the pressure control valve unit 71 to the fluid reservior (not shown) and designed for supplying pressurized working fluid.

The EV valve 71a includes an electromagnetic actuator 71g, such as solenoid. The electromagnetic actuator $71g_1$ is connected to the emitter electrode of a power transistor 71h, which comprises PNP transistor and has the base electrode connected to the anti-skid control unit 63. The collector electrode of the power transistor 71h is connected to the positive power source +B via a relay switch 71j. The relay switch 71j has a normally open contact. As long as no fault in the acceleration sensors is detected, the relay coil 1 is held energized for closing normally closed contact for establishing electrical connection between the positive power source +B and the collector electrode of the power transistor 71h. Similarly, the AV valve 71b includes an electromagnetic actuator $71g_2$, such as solenoid. The electromagnetic actuator $71g_2$ is connected to the collector electrode of a power transistor 71i which comprises NPN type transistor and has base electrode connected to the anti-skid control unit 63. On the other hand, the emitter electrode of the power transistor 71i is connected to the positive power source +B via the switching relay 71j electrode of a power transistor.

With the construction set forth above, the pressure control valve unit 71 essentially operates in three mutually different operational modes. Namely, the pressure control valve unit 71 operates in an APPLICATION mode for increasing braking pressure in the wheel cylinder 70, a RELEASE mode for decreasing braking pressure in the wheel cylinder, and a HOLD mode to maintain the braking pressure constant. In the APPLICATION mode position, the EV valve 71a is maintained in open position to establish fluid communication between the master cylinder 72 and the wheel cylinder 70 and the AV valve 71b is maintained closed position for blocking fluid communication between the wheel cylinder 70 and the pressure accumulator 71e. At the same time, the drain pump 71d may be held inoperative state.

In the RELEASE mode position of the pressure control valve unit 71, the EV valve 71a is held closed to block fluid communication between the inlet port to the outlet port and whereby blocking pressure is supplied from the master cylinder 8 to the wheel cylinder 70. At the same time, the AV valve 71b is maintained at open position to establish fluid communication between the outlet port, and the pressure accumulator 71e and the drain pump 71d so that the pressurized fluid in the wheel cylinder 70 can be drained to the pressure accumulator 71e or to the fluid reservoir via the drain pump 71d and the one-way check valve 71f. In order to drain part of the working fluid from the wheel cylinder to the fluid reservoir, the drain pump 71d is driven in this RELEASE mode. On the other hand, in the HOLD mode position, both the EV valve 71a and the AV valve 71b are held closed for completely disconnecting the wheel cylinder 70 from the inlet port and the pressure accumulator 71e.

The EV valve 71a is held in open position in response to LOW level EV signal and shifted to closed position in response to the HIGH level EV signal. On the other hand, the AV valve 71b is maintained at closed position as long as the AV signal is held LOW level and is opened by the HIGH level AV signal. The drain pump 71d is driven by the HIGH level MR signal.

The pressure control valve unit 71 is operated in the aforementioned three mode positions over skid control cycles. In general, skid control cycle is scheduled as follows:

1) the pressure control valve unit 71 is maintained at the APPLICATION mode position upon initiation of the braking operation which is triggered by depression of the brake pedal 73.

2) by application of the braking force to the brake pedal, working fluid pressure is built up in the master cylinder 72, since the pressure control valve unit 71 is held at the APPLICATION mode position, the braking pressure in the wheel cylinder 70 is increased linearly in proportion to increasing of the working fluid pressure to decelerate the wheel speed;

3) by increasing of the braking pressure, wheel deceleration $-\alpha$ (negative valve of wheel acceleration) increases and becomes greater than a predetermined deceleration threshold $-\alpha_2$, the anti-skid control unit 63 is responsive to the wheel deceleration increased across the deceleration threshold to initiate skid control cycle, upon which the skid control cycle enters into HOLD mode cycle period to place the pressure control valve unit 71 at the HOLD mode position to maintain the increased level of braking pressure constant;

4) by holding the increase level of braking pressure in the HOLD mode position of the pressure control valve unit 71, wheel is decelerated to increase wheel slippage across a predetermined wheel slippage threshold, the anti-skid control unit 63 is responsive to increasing of the wheel slippage increasing across the wheel slippage threshold to terminal the HOLD mode cycle period and trigger RELEASE mode cycle period, in which the pressure control valve unit 71 is placed in the RELEASE mode position to decrease braking pressure in the wheel cylinder 70;

5) by maintaining the pressure control valve unit 71 in the RELEASE mode position, braking pressure is reduced and thus wheel is accelerated to result in increasing of wheel acceleration $+\alpha$ across a predetermined wheel acceleration threshold $+\alpha_1$, the anti-skid control unit 63 is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 71 from the RELEASE mode position to the HOLD mode position in order to hold the braking pressure at the lowered level;

6) by maintaining the pressure control valve unit 71 at the HOLD mode, wheel speed is resumed and increased across the vehicle body speed and subsequently return to the speed corresponding to the vehicle body speed, the anti-skid control unit 63 is responsive to the wheel speed once increased across the vehicle body speed and subsequently return to the vehicle body speed to terminate HOLD mode cycle period and trigger APPLICATION mode cycle period;

The skid cycles 3) to 6) are repeated while anti-skid control is active.

The shown embodiment of the anti-skid brake control system is triggered in response to turning ON of the ignition switch to initiate power supply. Then, wheel speed sensors 3 start monitoring the rotation speed of respectively corresponding wheels 15. The wheel speed sensors 3 thus continuously produce the wheel speed indicative signals Vw. The alternating current form wheel speed indicative signals Vw, are cyclically or periodically converted into digital wheel speed indicative data Vw by the A/D converter in the input interface to be processed in the anti-skid control unit 63.

Figure 14:
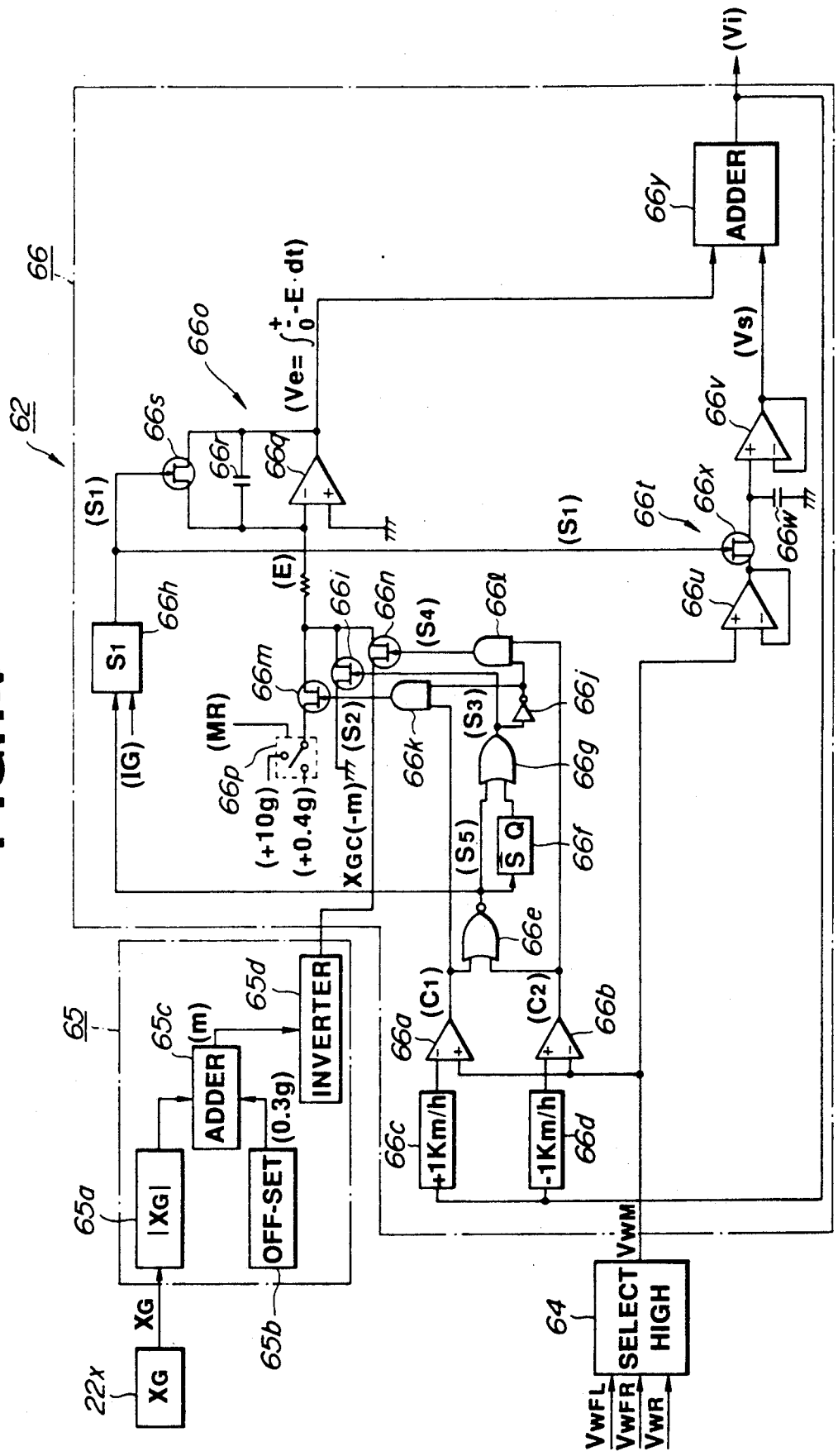
FIG. 14 is a block diagram of the vehicle speed representative data projecting circuit employed in the automotive activity control system of FIG. 2.

FIG. 14 shows the detailed construction of the vehicle speed representing a value projecting circuit 62. As set forth above, the vehicle speed representing the value projecting circuit 62 derives a vehicle speed representing value Vi based on the wheel speeds $Vw_{FL}$, $Vw_{FR}$ and $Vw_R$ as indicated in the wheel speed indicative signals from the wheel speed derivation circuit 41FL, 41FR and 41R. The vehicle speed representing value projecting circuit 62 includes comparators 66a and 66b. The comparator 66a has a non-inverting input terminal connected to the wheel speed derivation circuits 41FL, 41FR and 41R via a select circuit 64. On the other hand, the comparator 66b is connected to the wheel speed derivation circuits 41FL, 41FR and 41R at an inverting input terminal. An inverting input terminal of the comparator 66a is connected to output terminal of the vehicle speed representing value projecting circuit 62 through which the vehicle speed representing value Vi is output, through an adder 66c. On the other hand, the non-inverting input terminal of the comparator 66b is connected to the output terminal of the vehicle speed representing the value projecting circuit 62 through a substractor 66d. The adder 66c is designed to add a given value corresponding to 1 km/h of vehicle speed to the vehicle speed representing value Vi for providing dead band of $+1$ km/h. The value as the sum of the vehicle speed representing value Vi and the dead band value 1 km/h will be hereafter referred to as "higher vehicle speed reference value". Similarly, the subtractor 66d subtracts a given value corresponding to 1 km/h of the vehicle speed from the vehicle speed representing value Vi for providing dead band of $-1$ km/h. The value as the difference of the vehicle speed representing value Vi and the dead band value $-1$ km/h will be hereafter referred to as "lower vehicle speed reference value." The comparator 66a outputs a HIGH level comparator signal when the wheel speed $Vw_{FL}$, $Vw_{FR}$ or $Vw_R$ is higher than or equal to the higher vehicle speed reference value (Vi$_1$ $+1$ km/h). In other words, the comparator signal level of the comparator 66a is held LOW as long as the wheel speed $Vw_{FL}$, $Vw_{FR}$ or $Vw_R$ is maintained lower than the lower vehicle speed reference value (Vi$+1$ km/h). The comparator 66b outputs HIGH level comparator signal when the wheel speed $Vw_{FL}$, $Vw_{FR}$ or $Vw_R$ is lower than the lower vehicle speed reference value (Vi$-1$ km/h). In other words, the comparator signal level of the comparator 66a is held LOW as long as the wheel speed $Vw_{FL}$, $Vw_{FR}$ or $Vw_R$ is maintained higher than or equal to the lower vehicle speed reference value (Vi−1 km/h).

In the shown embodiment, the select switch 64 is switchable in operational modes between select LOW mode and select HIGH mode depending upon anti-skid control is active or not active. Namely, the select switch 64 operates in select LOW mode while the anti-skid control active state indicative signal MR is maintained LOW level, for selecting the smallest value of the wheel speed $Vw_{FL}$, $Vw_{FR}$ or $Vw_R$. On the other hand, the select switch 64 operates in select HIGH mode while the anti-skid control active state indicative signal MR is maintained at HIGH level to indicate active state of the anti-skid brake control, for selecting the greatest value of the wheel speed $Vw_{FL}$, $Vw_{FR}$ or $Vw_R$.

The output terminals of the comparators 66a and 66b are connected to input terminals of NOR gate 66c to feed the comparator signals $C_1$ and $C_2$ thereto. The NOR gate 66c outputs HIGH level gate signal while signal levels of both of the comparator signals $C_1$ and $C_2$ are maintained LOW. Namely, the gate signal output from the NOR gate 66c is held LOW while the select input of the wheel speed $Vw_{FL}$, $Vw_{FR}$ or $Vw_R$ is maintained higher than or equal to the vehicle speed representing value Vi+1 km/h and lower than the higher vehicle speed reference value (Vi+1 km/h). The gate signal of the NOR gate 66c is fed to a timer 66f, an OR gate 66g and a shot-pulse generator 66h, respectively. The timer 66f is responsive to the trailing edge of the HIGH level NOR gate signal to output a timer signal for a given period of time, e.g. 0.1 sec. The timer signal is fed to the OR gate 66g.

The OR gate 66g thus receives the NOR gate signal at one input terminal and the timer signal from the timer 66f at the other input terminal. An OR gate signal of the OR gate 66f is transmitted to a gate of an analog switch 66i as a selector signal $S_3$. The output terminal of the OR gate 66g is also connected to one input terminal of an AND gates 66k and 66l via an inverter 66j. The other input terminal of the AND gate 66k is connected to the output terminal of the comparator 66a to receive therefrom the comparator signal $C_1$. Similarly, the other input terminal of the AND gate 66f is connected to the output terminal of the comparator 66b to receive the comparator signal $C_2$ therefrom. Therefore, the gate signal $S_2$ of the AND gate 66k becomes HIGH while the comparator signal $C_1$ is maintained at HIGH level and the NOR gate signal is held LOW. The gate signal $S_2$ serves as a selector signal. On the other hand, the gate signal $S_4$ of the AND gate 66l becomes HIGH level while the comparator signal $C_2$ is maintained HIGH and the NOR gate signal is held LOW. This gate signal $S_4$ also serves as selector signal. The AND gates 66k and 66l are connected to gates of analog switches 66m and 66n.

The analog switch 66i is turned ON in response to HIGH level selector signal $S_3$ to drop the supply voltage of an integrator circuit 66o to zero. On the other hand, the analog switch 66k is turned ON in response to the HIGH level selector signal $S_2$ to supply a voltage E corresponding to a possible maximum wheel acceleration, e.g. 0.4G, to the integrator circuit 66o. The analog switch 66n is connected to a correction circuit 65 which is designed for correcting the longitudinal acceleration indicative signal value $X_G$ for deriving a minimum wheel acceleration representative value $X_{GC(-m)}$. The analog switch 66h is likewise turned ON in response to the HIGH level selector signal $S_4$ to supply a voltage corresponding to a possible minimum wheel acceleration value to the integrator circuit 66o.

The correction circuit 65 includes an absolute value circuit 65a connected to the longitudinal acceleration sensor 22X to receive therefrom the longitudinal acceleration indicative signal $X_G$ and output absolute value signal representative of the absolute value $|X_G|$ of the longitudinal acceleration indicative signal. The absolute value signal of the absolute value circuit 65a is input to an adder 65c. The adder 65c also receives an offset value from an offset value generator circuit 65b. The adder output is supplied to the analog switch 66n via an inverter 65d as the minimum wheel acceleration representative value $X_{GC(-m)}$.

The integrator circuit 66o has a per se well known construction and includes an amplifier 66q, a capacitor 66r and an analog switch 66s. The gate of the analog switch 66s is connected to the shot-pulse generator 66h to receive therefrom a shot-pulse which serves as a reset signal $S_1$. The integrator 66o is reset by the HIGH level reset signal $S_1$ and is responsive to the trailing edge of the HIGH level reset signal to reset the integrated value. The integrator circuit 66o integrates the supply voltage E after termination of the HIGH level reset signal $S_1$ to output the integrator signal. The shot-pulse generator 66h is responsive to an ON-set signal IG of an ignition switch to generate a first shot pulse as the first reset signal for resetting the integrator circuit 66o. The shot-pulse generator 66h subsequently generates the shot-pulses serving as the reset signal $S_1$ at every leading edge of the HIGH level NOR gate signal. As set forth above, since the NOR gate signal becomes HIGH when the select input of the wheel speeds $Vw_{FL}$, $Vw_{FR}$ and $Vw_R$ satisfies (Vi−1 km/h) <=Vw<(Vi+1 km/h), the integrated value of the integrator 66o is reset every occurrence of the wheel speed Vw in the aforementioned range. The reset signal $S_1$ of the shot-pulse generator 66h is also supplied to a sample hold circuit 66t. The sample hold circuit 66t comprises a buffer amplifiers 66u and 66v, a capacitor 66w and an analog switch 66x. The analog switch 66x is connected to the shot-pulse generator 66h to receive the reset signal $S_1$ at the gate thereof to be turned ON. The sample hold circuit 66t is responsive to turning ON of the analog switch 66x to reset the held wheel speed value. The sample hold circuit 66t, in absence of the reset signal $S_1$ from the shot-pulse generator 66h, samples and holds the instantaneous wheel speed value Vw at the occurrence of the reset signal as a sample value Vs. The sample hold circuit 66t outputs a sample/hold signal having a value indicative of the sample value Vs to an adder 66y. The adder 66y receives the sample/hold signal from the sample hold circuit 66t and integrator signal from the integrator 66o. As will be appreciated, the integrator signal has a value indicative of an integrated value $$Ve\left(=\int_0^t (-E)\cdot dt\right).$$

Therefore, the adder 66y addes the integrated value Ve to the sample value Vs to derive the vehicle speed representing value Vi. The output terminal of the adder 66y is connected to the anti-skid control unit 63.

Figure 15:
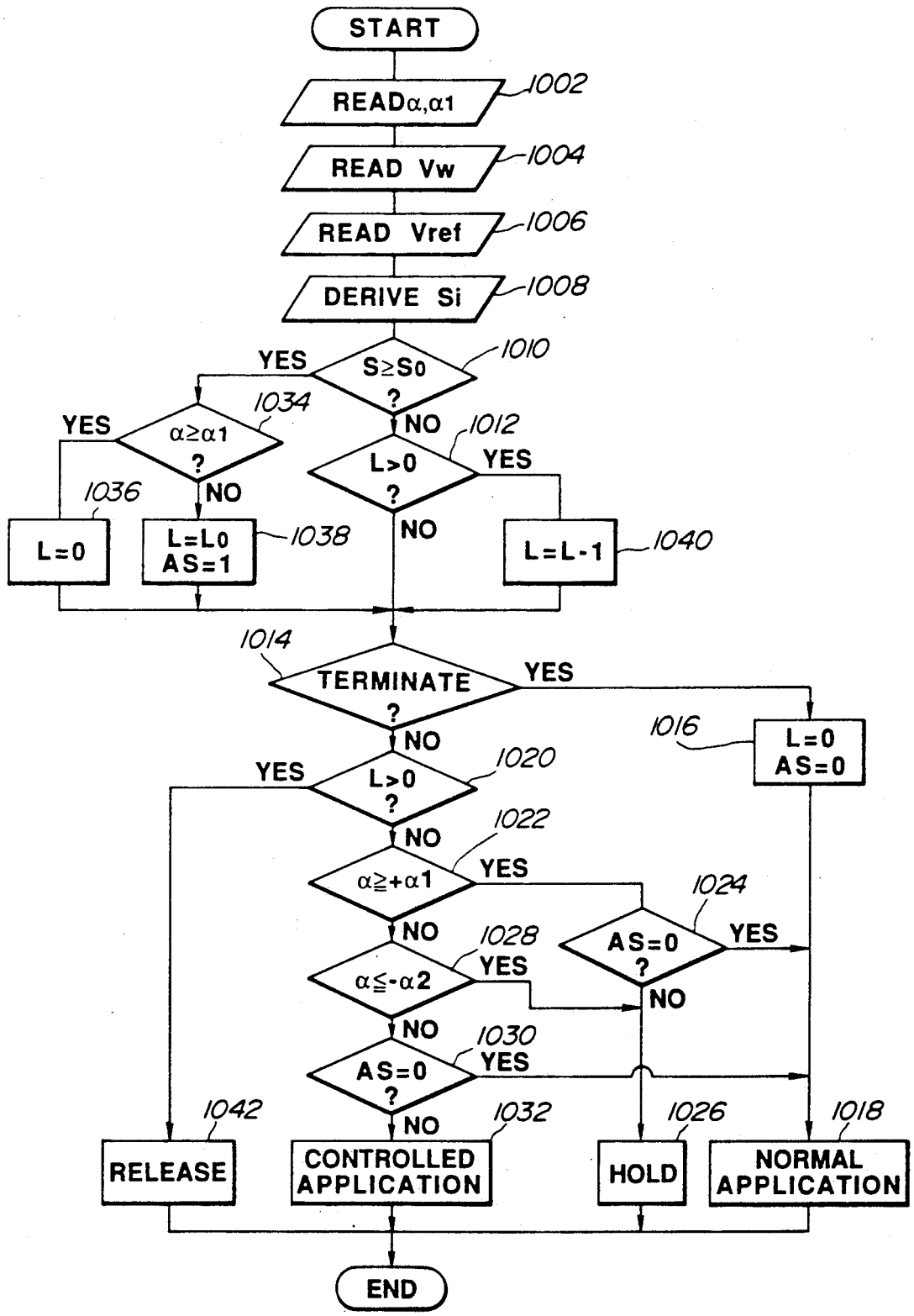
FIG. 15 is a flowchart showing process of anti-skid brake control to be performed by the preferred embodiment of the automotive activity control system of FIG. 2.
Figure 16:
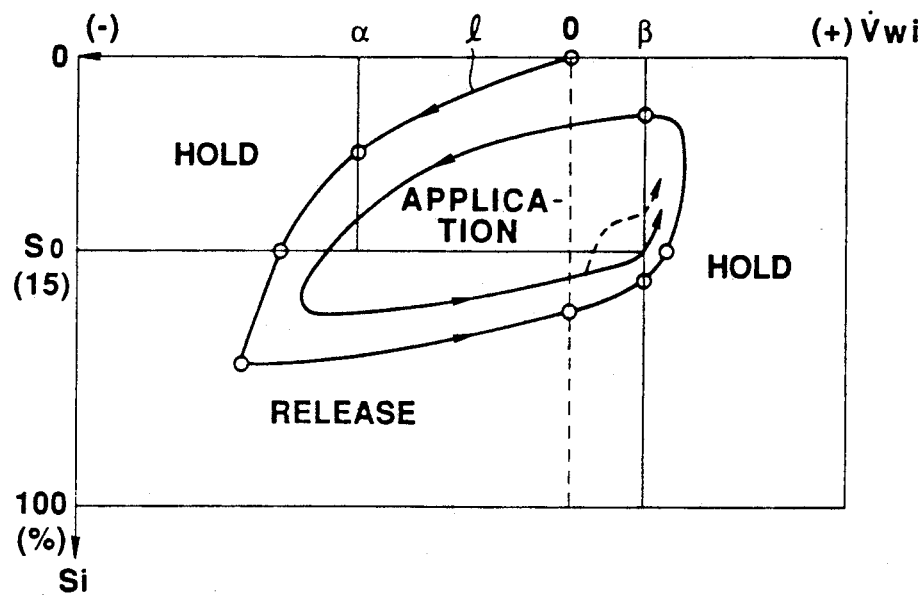
FIG. 16 is a diagram showing process of anti-skid operation to be performed by the preferred embodiment of the automotive activity control system.

FIG. 15 shows a skid cycle control routine for controlling the skid control cycle generally according to the schedule set forth in the general discussion of the process of anti-skid brake control.

Immediately after starting execution, the selected average wheel acceleration indicative data α and the selected wheel deceleration threshold $-α_2$ are read out at a step 1002. At a step 1004, the wheel speed indicative data Vw is read out. At a step 1006, the vehicle body speed representative data $V_{ref}$ is read out. At a step 1008, the wheel slippage Si is derived according to the following equation:

$$Si = \{(V_{ref} - Vw)/V_{ref}\} \cdot 100(\%)$$

The wheel slippage Si is compared with a predetermined wheel slippage threshold $S_0$ at a step 1010. The wheel slippage threshold $S_0$ may be set at about the optimum wheel slippage range where an optimum vehicle braking efficiency can be obtained. In the shown embodiment, the wheel slippage threshold $S_0$ is set at 15%.

The shown embodiment performs APPLICATION mode operation in mutually different two way modes. The braking pressure increases linearly according to increasing of the fluid pressure built up in the master cylinder 72. Such operational mode will be hereafter referred to as "NORMAL APPLICATION mode". The pressure control valve is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower increasing speed of the braking pressure in the wheel cylinder so that the braking pressure is held at a level close to a pressure where the optimum wheel slippage is obtained and hereafter referred to as "lock pressure", for an expanded period.

At the initial stage of the braking operation, wheel slippage Si is held smaller than that wheel slippage threshold $S_0$. Therefore, the answer at the step 1010 at the initial braking state becomes negative. Then, at a step 1012, check is performed whether a RELEASE mode timer value L of a RELEASE mode timer (not shown but facilitated in the arithmetic circuit 12c of the microprocessor) is greater than zero or not. At this time, the RELEASE mode timer value L is maintained at zero, the answer at the step 1012 also becomes negative. Then, at a step 1014, judgement is made that the condition satisfies a predetermined skid control terminating condition.

In the practical embodiment, the skid control terminating conditions are set as follows:
when the vehicle body speed indicative data $V_{ref}$ is smaller than or equal to a vehicle body stopping state indicative reference value $V_{ref0}$;
when number of occurrence of switching of the pressure control valve mode position in the CONTROLLED APPLICATION mode becomes greater than or equal to a predetermined value $N_0$; and
when the brake switch is turned OFF.

When the skid control terminating condition is satisfied as checked at the step 1014, the RELEASE mode timer value L is cleared and a skid control state indicative period flag AS is reset at a step 1016. At a step 1018, the NORMAL APPLICATION mode skid control cycle period is commanded. Thereafter, process goes the END.

If the skid control terminating condition as checked at the step 1014 is not satisfied, the RELEASE mode timer value L is again checked at a step 1020. When the RELEASE mode timer value L is smaller than or equal to zero as checked at the step 1020, the wheel acceleration Δ is compared with a predetermined acceleration threshold $+α_1$ at a step 1022. If the acceleration as checked at the step 1022 is greater than or equal to the wheel acceleration threshold $+α_1$, it means that the wheel is not yet decelerated after initiation of increasing of the braking pressure or wheel is accelerating during RELEASE mode cycle period. Therefore, in order to discriminate the instantaneous status of the braking condition, a check is performed to determine whether the skid control state indicative flag AS is set at a step 1024. When the skid control state indicative flag AS is not set as checked at a step 1024, then process goes through the step 1018 for setting the operation mode to the NORMAL APPLICATION mode.

On the other hand, when the skid control state indicative flag AS is set as checked at, the step 1024, then judgement is made that it is the time to switch the skid control cycle from the RELEASE mode cycle period to the HOLD mode cycle period because the wheel acceleration α is held greater than the wheel acceleration threshold $+α_1$ and the operational mode is held in the RELEASE mode. Then, HOLD mode cycle period is commanded at a step 1026. After commanding the HOLD mode cycle period, the process goes to END.

On the other hand, when the wheel acceleration α as compared with the wheel acceleration threshold $+α_1$ at the step 1022, is smaller than the acceleration threshold $+α_1$, then the wheel acceleration α is checked with a predetermined wheel deceleration threshold $-α_2$ at a step 1028. When the wheel acceleration α as checked at the step 1028 is smaller than the wheel deceleration threshold $-α_2$, it means that the braking condition requires anti-skid control. Then, at the step 1026, the HOLD mode cycle period is commanded for placing the pressure control valve is at the HOLD mode position, at a step 1026.

If the wheel acceleration α as compared with the wheel deceleration threshold $-α_2$ at the step 1028 is greater than the wheel deceleration threshold, the skid control state indicative flag AS is checked at a step 1030. If the skid control mode indicative flag AS is not set as checked at the step 1030, process goes to the step 1018. On the other hand, when the skid control state indicative flag AS is not set as checked at the step 1030, the CONTROLLED APPLICATION mode cycle period is commanded at a step 1032.

On the other hand, when wheel slippage Si as checked at the step 1010 is greater than or equal to the wheel slippage threshold $S_0$, then the wheel acceleration α is compared with the wheel acceleration threshold $+α_1$ at a step 1034. When the wheel acceleration α as checked at the step 1030 is greater than or equal to the wheel acceleration threshold $+α_1$, judgement can be made that the condition does not satisfy to perform the RELEASE mode skid control cycle period operation. Therefore, the RELEASE mode timer value L is cleared at a step 1036. On the other hand, when the wheel acceleration α as checked at the step 1034 is smaller than the wheel acceleration threshold $+α_1$, judgement can be made that a condition for performing the RELEASE mode skid control mode cycle period is satisfied. Therefore, at a step 1038, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicative flag AS is set.

When the RELEASE mode timer value L as checked at the step 1012 is greater than zero (0), then, the RELEASE mode timer value L is decremented by one (1) at a step 1040 and thereafter process moves to the step 1014. When the RELEASE mode timer value L as decremented at the step 1040 is still held greater than zero (0), the answer at the step 1020 becomes positive since the RELEASE mode timer value is greater than zero. Then, process goes to a step 1042 to command the RELEASE mode skid control cycle period.

Operation of the aforementioned control system will be discussed herebelow. Assuming that the vehicle is in a state of parking and all sensors are acting in normal state, power supply for the fault detector circuit 23 and the control unit 25 is started in response to turning ON of the ignition switch. In response to starting of power supply, check is performed for the longitudinal and lateral acceleration sensors 22X and 22Y. At this time, since the vehicle is in parking state and assuming that the vehicle is parked on the flat and horizontal road, the longitudinal acceleration indicative signal value $X_G$ and the lateral acceleration indicative signal value $Y_G$ are both "zero" as long as the sensors are operating in normal state.

At this time, the flipflops 35c and 35d in the fail-safe circuit 35 are maintained at states of reset by the leading edge of the ignition signal IG. Since the Q outputs of the flipflop 35c and 35d are held LOW level, the transistors 35f and 35g are maintained non-conductive. As a result, the fault alarm lamp 39a is held OFF. On the other hand, the switching transistor 35f is held ON for maintaining the relay coil 1 of the relay switch 80 energized for closing the normally open relay switch. As a result, the collector electrode of the transistor 71h and the emitter electrode of the transistor 71a are connected to the positive power source +B via the relay switch 80.

At the time, since the fault indicative signals $AB_1$ and $AB_2$ of the fail-safe circuit 35 is held LOW level and the anti-skid active state indicative signal MR is also LOW level, the $T_M$ indicative signal of the power distribution deriving circuit 31 is selected by the multiplexer 36. At this time, since the vehicle is in the parking state, the wheel speed indicative signal $N_{FL}$, $N_{FR}$ and $N_R$ output from the wheel speed sensors 21FL, 21FR and 21R are held zero. Therefore, the wheel speed indicative data $Vw_{FL}$, $Vw_{FR}$ and $Vw_R$ derived by the wheel speed deriving circuits $41_{FL}$, $41_{FR}$ and $41_R$ and the wheel speed difference $\Delta Vw$ derived by the wheel speed difference deriving circuit 42 are zero. Therefore, the select HIGH output of the select HIGH circuit 38 selected from the $T_M$ indicative signal derived by the power distribution deriving circuit 31 and the $T_V$ indicative signal derived by the vehicle speed dependent engaging force deriving circuit 33a, is held at zero. Therefore, the solenoid 20g is held at an inoperative state to maintain the clutch disengaged. Therefore, the output torque of the engine is transmitted only to the rear wheels 2RL and 2RR via the propeller shaft 10. At this position, the vehicle is started to run setting the transmission 5 in two wheel drive mode.

Figure 10:
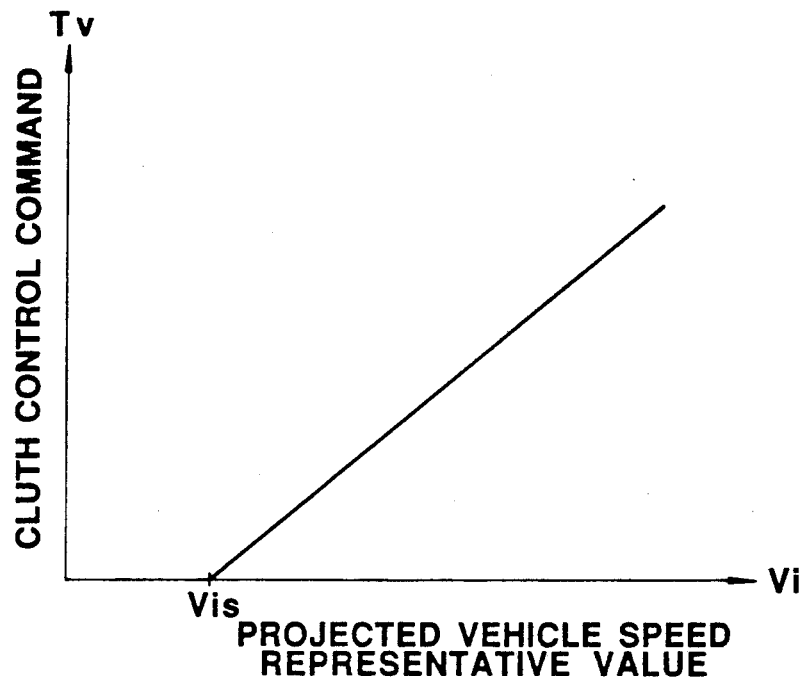
FIG. 10 is a chart showing relationship between a clutch control command $T_V$ and a projected vehicle speed representative data $V_i$.

Here, assuming that the vehicle travels on a dry and high friction road, the average wheel speed $Vw_R$ of the rear wheels 2RL and 2RR as the driving wheel is substantially equal to the wheel speed $Vw_{FL}$ and $Vw_{FR}$ of the front wheels 2FL and 2FR. Therefore, the wheel speed difference $\Delta Vw$ derived by the wheel speed difference deriving circuit 42 is held substantially at zero. As a result, the $T_M$ indicative signal value as derived by the power distribution control circuit 31 is maintained at zero. At this time, since no wheel causes wheel slipping and the anti-skid brake control is not active, the projected vehicle speed representative data Vi is derived on the basis of the select LOW input from the select circuit 64 acting in the select LOW mode. As long as the vehicle speed is maintained lower than a predetermined criterion and thus the projected vehicle speed representative data Vi is held smaller than the threshold value Vis as shown in FIG. 10, the $T_V$ indicative signal to be derived by the vehicle speed dependent engaging force deriving circuit 33a is also maintained at LOW level. Therefore, the select HIGH input from the select HIGH circuit 38 is maintained zero. As a result, the clutch assembly is maintained disengaged for maintain the two wheel driving mode. The vehicle is thus driven in two wheel drive mode.

As long as the vehicle is moderately accelerated, wheel spin will not be caused on any of the wheels. Therefore, the wheel speed difference $\Delta Vw$ is maintained at substantially zero. On the other hand, as can be seen from FIG. 18(a), the projected vehicle speed representative data Vi which is derived on the basis of the select LOW input $Vw_L$ increases according to increasing of the vehicle speed. As a result, the $T_V$ indicative signal of the vehicle speed dependent engaging force deriving circuit 33a increases in linearly proportional fashion as illustrated in FIG. 10. Therefore, the select HIGH switch 38 selects the $T_V$ indicative signal. As a result, the engaging force of the clutch assembly 16 is derived on the basis of and increased according to the $T_V$ indicative signal.

On the other hand, when the abrupt acceleration is then commanded or when the road surface condition is changed into low friction, such as wet condition or snow road condition, wheel slippage is caused in the driving wheel 2RL and 2RR. As a result, the average rear wheel speed $Vw_R$ becomes higher than the front wheel speeds $Vw_{FL}$ and $Vw_{FR}$. Therefore, the wheel speed difference $\Delta Vw$ is increased according to increasing of the wheel slippage. Accordingly, the $T_M$ indicative signal value derived by the power distribution deriving circuit 31 becomes greater than the $T_V$ indicative signal value derived by the vehicle speed dependent engaging force deriving circuit 33a. Therefore, the engaging force for the clutch assembly 16 is increased for energizing the solenoid 20g by turning ON the power transistor 20j according to increasing of the wheel speed difference $\Delta Vw$. Therefore, the clutch is engaged for making the transfer unit 6 active. Therefore, the part of the driving torque from the transmission is transmitted to the front wheels 2FL and 2FR via the gear train 17 and the front side output shaft 7. The vehicle is thus driven in four wheel drive mode.

At this four wheel drive mode, if the steering operation for a relatively large steering angle is performed, a lateral acceleration is exerted on the vehicle body. As a result, the lateral acceleration indicative signal $Y_G$ output from the lateral acceleration sensor 22Y is increased. The lateral acceleration indicative signal $Y_G$ is processed by the input filter 43 and the gain deriving circuit 44. The gain deriving circuit 44 thus derives the gain K (=a/Y$_G$: a is constant). As can be appreciated herefrom, according to increasing of the lateral acceleration indicative signal value Y$_G$, the gain K derived by the gain deriving circuit becomes smaller. Since the gain K derived in the gain deriving circuit 44 is used in the arithmetic circuit 45 for deriving the T$_M$ indicative signal value through the following equation:

$$T_M = K \cdot \Delta V_w$$

Therefore, according to increasing of the lateral acceleration, the value of the T$_M$ indicative signal output from the power distribution deriving circuit 31 or the T$_V$ indicative signal supplied from the vehicle speed dependent engaging force deriving circuit 33a is decreased to lower the magnitude of the control current I$_{SOi}$ supplied to the solenoid 20g. This causes reduction of the engaging force to be exerted on the clutch assembly 20f to reduce ratio of driving torque to be delivered to the front wheels 2FL and 2FR. As can be appreciated, by reduction of the driving torque to be distributed to the front wheels, the steering characteristics is changed toward over-steer characteristics.

On the other hand, when the brake pedal is depressed for abrupt deceleration, anti-skid brake control becomes active. Basically, anti-skid brake control is triggered in response to wheel deceleration (negative acceleration) is increased across a predetermined deceleration threshold or, in the alternative in response to wheel slippage increased across a predetermined wheel slippage threshold.

When the anti-skid brake control becomes active, the anti-skid active state indicative signal MR becomes HIGH level. Therefore, the multiplexer 36 selects the T$_{EB}$ indicative signal of the power distribution deriving circuit 33 for controlling the engaging force of the clutch assembly 16 in the transfer unit 6. The power distribution deriving circuit 33 utilizes the engine speed data N as derived by the engine speed derivation circuit 33a. The arithmetic circuit 33b of the power distribution deriving circuit 33 multiplies the engine speed data N by a predetermined constant b to derive the T$_{EB}$ indicative signal. Therefore, the engaging force of the clutch assembly 16 is controlled by the T$_{EB}$ indicative signal. At this time, since the T$_{EB}$ indicative signal value is derived irrespective of the wheel speed, influence of wheel speed variation caused by action of the anti-skid brake control can be successfully avoided.

The lateral acceleration sensor 22Y causes failure at a time t$_r$, as shown in FIG. 9, to produce the lateral acceleration indicative signal Y$_G$ representing the lateral acceleration magnitude greater than that actually exerted on the vehicular body, as shown by broken line in FIG. 9(a). Because the T$_M$ indicative signal value is derived by utilizing the gain K which is variable depending upon the magnitude of the lateral acceleration indicative signal Y$_G$ and is decreased according to the increase of the lateral acceleration, the engaging force for the clutch assembly 16 can be reduced to be smaller than that should be in view of the actually exerted lateral acceleration, by increasing the T$_M$ indicative signal value as shown by solid line in FIG. 9(b).

On the other hand, at the time t$_1$, the output value of the arithmetic circuit 26a becomes increased. As a result, the output of the comparator 26b turns into HIGH level. Therefore, the output level of the timer 26c turns into HIGH level after expiration of the predetermined period of time, e.g. 0.5 sec. Therefore, HIGH level fault indicative signal AA is supplied to the fail-safe circuit 35. The flipflop 35a of the fail-safe circuit 35 is thus set by the HIGH level fail indicative signal AA. This turns the Q output level of the flipflop into HIGH level to supply an electric power to the alarm lamp to turn the latter ON. Since this HIGH level Q output of the flipflop 35a is supplied to the multiplexer 36, the multiplexer selects the T$_{FS}$ indicative signal of the engaging force reducing magnitude deriving circuit 32 for controlling the engaging force of the clutch assembly 16.

The engaging force reducing magnitude derivation circuit 32 becomes active for latching the select HIGH input of the T$_M$ indicative signal and the T$_V$ indicative signal at the occurrence of the fault indicative signal AA by charging the capacitor 53 during a period determined by the FTE 52 and the one-shot multivibrator 51. The engaging force reducing magnitude derivation circuit 32 is responsive to the fail-safe signal AB$_1$ to turn OFF the FET 55 at a time t$_2$. The intergration circuit 56 then starts integration by taking the constant voltage +B as the initial value. The integrated value decreases according to expansion of the integration period and is supplied to the adder 57. The output of the adder 57 is thus decreased from the initially latched value according to expansion of the period to maintain the fail-safe signal AB$_1$. Therefore, the engaging force is gradually decreased to zero for switching driving mode from the four wheel drive mode to the two wheel drive mode. This results in reduction of cornering force at the rear wheels for preventing the driving wheels (rear wheels) from causing spinning and thus assures vehicular driving stability.

Similarly, when the longitudinal acceleration sensor 22X causes failure to have greater value than the longitudinal acceleration actually exerted on the vehicular body, the output of the arithematic circuit is increased according to increasing of the longitudinal acceleration to cause HIGH level comparator signal of the comparator 26b. Therefore, after expiration of the predetermined period of time, e.g. 0.5 sec., the fail-safe signal AB$_1$ is provided.

Subsequently, the operation of the projected vehicle speed representative data deriving circuit 62 and the anti-skid control section will be discussed for facilitating better understanding of the invention.

Figure 18:
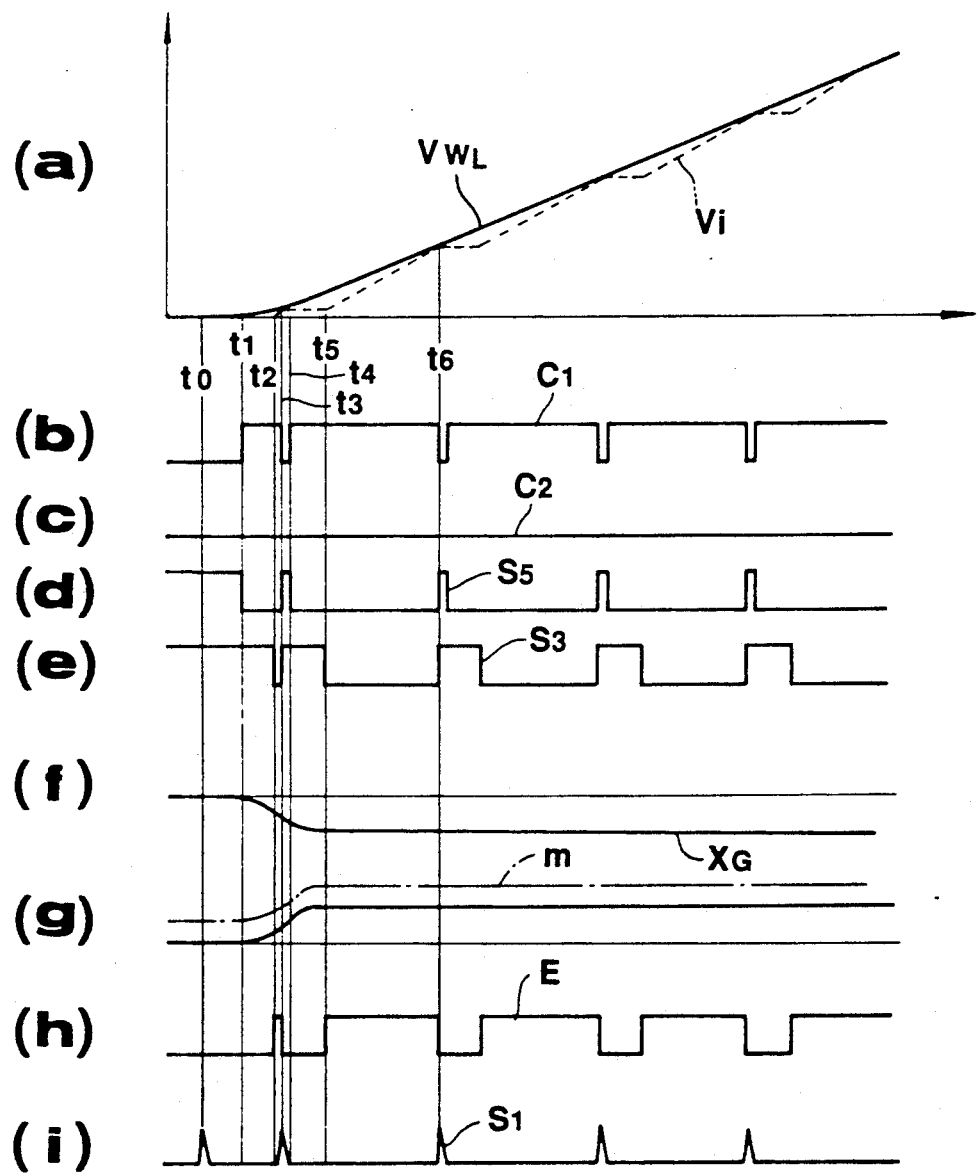
FIG. 18 is a timing chart showing showing operation of the vehicle speed representative data projecting circuit of FIG. 14, during moderate acceleration.
Figure 19:
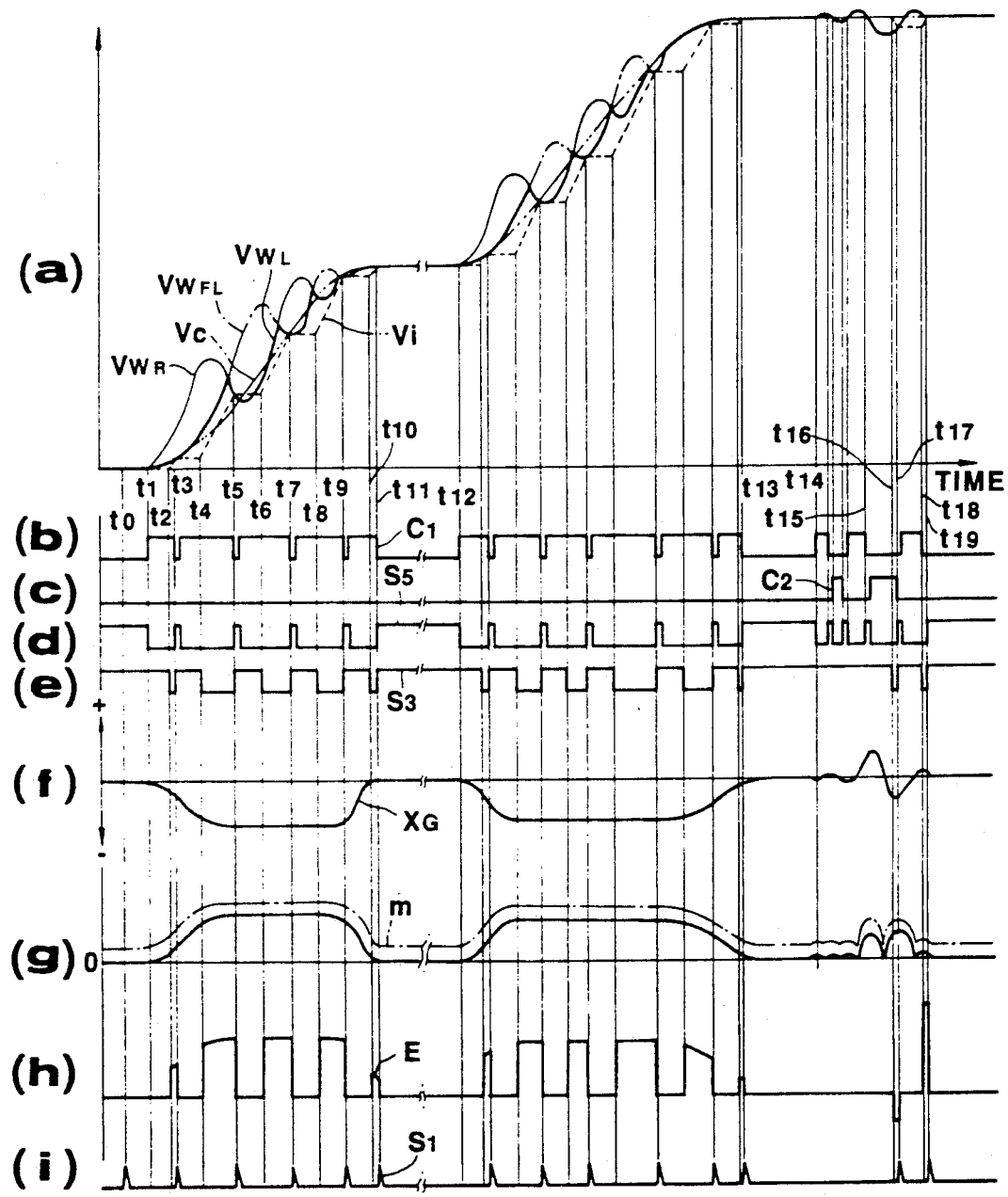
FIG. 19 is a timing chart showing showing operation of the vehicle speed representative data projecting circuit of FIG. 14, during abrupt acceleration.

In the operation, assuming that the vehicle is now in parking state and the engine 1 is not running, power supply for the steering control unit 31 and the anti-skid brake control unit 29 are shut-down. In response to turning ON the key switch to drive the engine, power supply for the steering control unit 31 and the anti-skid brake control system is initiated. At this time, since the longitudinal acceleration indicative input from the longitudinal acceleration sensor 22X is held zero (0) as shown in FIG. 18(g) and FIG. 19(g), therefor, the output m of the adder circuit 65c of the correction circuit 65 becomes a value only containing given offset value 0.3 g, as illustrated by phantom line in FIG. 18(g) and FIG. 19(g). Therefore, the input for the vehicle speed representative value projecting circuit 62 from the inverted circuit 65d becomes the inverted value (−m) of the adder output m as shown in FIG. 18(f) and FIG. 19(f).

Assuming that the ignition switch is subsequently turned on at a time t$_0$, the ON set signal IG of the ignition switch is supplied to the shot pulse generator 66h.

The shot-pulse generator 66h is responsive to the ON set signal IG for outputting the HIGH level reset signal $S_1$, as shown in FIG. 18(i) and FIG. 19(i). The HIGH level rest signal $S_1$ is supplied to the sample/hold circuit 66t for resetting the latter. At this time, since the anti-skid control active state indicative signal MR is maintained at LOW level, the select circuit 64 in the anti-skid brake control section 28 is maintained in a select LOW mode. Therefore, the select circuit 64 outputs the select LOW input $Vw_L$ which is maintained at substantially zero (0), as shown by broken line in FIG. 18(a) and FIG. 19(a). Also, the HIGH level reset signal $S_1$ is also supplied to the integrator circuit 66o for resetting the latter. Therefore, the integrator output Ve also becomes zero (0). As a result, the sample value Ve of the sample/hold circuit 66t becomes zero (0).

At this time, since both of the projected vehicle speed representative value Vi and the select LOW input $Vw_L$ are zero (0), the outputs $C_1$ and $C_2$ of the comparators 66a and 66b are both held at LOW level, as shown in FIGS. 18(b) and 18(c) and FIGS. 19(b) and 19(c). In response to these LOW level comparator outputs $C_1$ and $C_2$ from the comparators 66a and 66b, HIGH level gate signal is output from the NOR gate 66c as shown in FIG. 18(d) and FIG. 19(d). Accordingly, the select signal $S_3$ of the OR gate 66g is held at HIGH level as shown in FIG. 18(e) and FIG. 19(e). The select signal $S_3$ is fed to the analog switch 66i to turn the latter ON. The select signal $S_3$ is also fed to the AND gates 66k and 66l via the inverter 66j. Therefore, the inputs for the AND gates 66k and 66l through the inverter 66j are maintained at LOW level. This disables the AND gates 66k and 66l from generating select signals $S_2$ and $S_4$. At the same time, since the input of the analog switch 66i is grounded, the input voltage E from the integrator circuit 53o is maintained at zero (0) as illustrated by solid line in FIG. 18(h) and FIG. (19h). At this time, the projected vehicle speed representative value Vi is derived by the adder circuit 66y and is a sum value of the integrator output Ve of the integrator circuit 66o and the sample value Vs of the sample/hold circuit 66t.

After vehicle starts to run, the vehicle accelerates. During initial acceleration state of the vehicle, the select LOW input $Vw_L$ from the select circuit 64 increases as illustrated by solid line in FIG. 18(a) and FIG. 19(a) depending upon magnitude of acceleration demand entered through an acceleration pedal. If the select LOW input $Vw_L$ becomes greater than or equal to (Vi+1 km/h) at a time $t_1$, the comparator output $C_1$ of the comparator 66a turns into HIGH level. At this time, the output of the OFF delay timer 66f is maintained at HIGH level for a predetermined period $T_3$ from the time $t_1$. Therefore, the select signal $S_3$ of the OR gate 66g is maintained HIGH level for the period $T_3$. During this period $T_3$, the projected vehicle speed representative value Vi output from the adder 66y is maintained at zero (0). At a time $t_2$ where the predetermined period $T_3$ from the time $t_1$, expires, the level of the select signal $S_3$ of the OR gate 66g turns into LOW level. In response to the trailing edge of the HIGH level select signal $S_3$ as the signal level turned from HIGH level to LOW level at the time $t_2$, the analog switch 66i turns OFF. At the same time, in response to HIGH level input via the inverter 66j, the analog switch 66m turns ON. Then, the preset value corresponding to a predetermined acceleration magnitude, e.g. +0.4 g, is fed to the integrator circuit 53o via the conductive state analog switch 66m. Therefore, the integrated value Ve increases according to expiration of time. The integrated value Ve is then added with the sampled value Vs from the sample/hold circuit 66t to increase the projected vehicle speed representative value Vi as illustrated by broken line in FIG. 18(a) and FIG. 19(a).

When the projected vehicle speed representative value Vi becomes equal to the select LOW input $Vw_L$ from the select HIGH circuit 64 at a time $t_3$, the comparator output $C_1$ of the comparator 66a turns LOW level to cause HIGH level gate output of the NOR gate 66e. In response to this, the integrator circuit 66o is reset and the analog switch 66i turns ON. By resetting, the integrator output Ve becomes zero (0). At the same time, the sample/hold circuit 66t is reset to hold the instantaneous select LOW input $Vw_L$ at the time $t_3$. Since the vehicle is still in the acceleration state, the select LOW input $Vw_L$ becomes greater than the projected vehicle speed Vi. This causes the comparator output $C_1$ of the comparator 66a again turns into HIGH level at a time $t_4$. Therefore, at a time $t_5$ after expiration of the predetermined period $T_3$ from the time $t_4$, the analog switch 66m turns ON. Therefore, the projected vehicle speed representative value Vi is increased at a rate corresponding to the predetermined value representative of 0.4 G. By this the projected vehicle speed representative value Vi again becomes equal to the select LOW input $Vw_L$ at a time $t_6$, then the integrator circuit 66o and the sample/hold circuit 66t are reset in the same process as that performed at the time $t_3$.

As can be seen from FIG. 19(a), the operation of aforementioned cycles in projecting the vehicle speed representative data Vi is repeated through the period $t_6$ to $t_{11}$. From the time $t_{11}$, the vehicle speed is maintained at substantially constant until a time $t_{12}$. Since the vehicle speed is maintained substantially constant, the select LOW input $Vw_L$ of the select circuit 64 is maintained smaller or substantially equal to the projected vehicle speed representative data Vi. Therefore, the comparator output $C_1$ is maintained at LOW level to maintain the select signal $S_3$ at HIGH level as shown in FIG. 19(e). At the time $t_{12}$, the vehicle start to accelerate again. Therefore the process of derivation of the projected vehicle speed representative data Vi as set out with respect to the period between $t_1$ to $t_6$ is repeated for varying the projected vehicle speed representative data Vi in stepwise fashion.

Assuming that the vehicle speed V is held substantially constant after the time $t_{14}$ with substantially small fluctuation, the select LOW input $Vw_L$ fluctuates at intervals shorter than the predetermined period $T_3$. As a result, as can be seen in the period between the time $t_{14}$ through $t_{16}$, the output level of the OR gate 66g is maintained at HIGH level by the HIGH level input from the OFF delay timer 66f despite of repeated variation of the output level of the NOR gate 66e. Therefore, the integrator output Ve of the integrator circuit 66o is maintained at zero (0). The output of the adder circuit 66y as the projected vehicle speed representative value Vi is maintained at a value corresponding to the sampled value Vs as sampled by the sample/hold circuit 66t at the time $t_{13}$.

At a time $t_{17}$ after short period of the time $t_{16}$, the select LOW input $Vw_L$ becomes smaller than (Vi−1 km/h). In response to this, the gate signal of the NOR gate 66e drops to LOW level and is maintained at LOW level even after a time $t_{19}$ at which the predetermined period $T_3$ expires. At this time, since the select HIGH input $Vw_M$ is smaller than (Vi−1 km/h), the comparator output $C_2$ of the comparator 66b turns into HIGH level. As a result, the select signal $S_4$ of the AND gate 66l becomes HIGH level to turn the analog switch 66n ON. Therefore, the output $X_{GC}(-m)$ of the correction circuit 65 is supplied to the integrated circuit 66o for varying the input voltage E as illustrated in FIG. 19(h). As a result, the integrator output Ve of the integrator circuit 66o is decreased at a rate of $-m$. Therefore, the projected vehicle speed representative value Vi as the sum of the sample value Vs of the sample/hold circuit 66t and the integrated value Ve of the integrator circuit 66o is decreased at the rate of $-m$.

Assuming braking operation is initiated by depression of the brake pedal at a time $t_{12}$ of FIG. 20, vehicle enters into deceleration state. Therefore, the select input $Vw_s$ of the select circuit 64 decreases according to deceleration demand entered through the brake pedal. Unless the anti-skid control becomes active, the pressure control valve 71 is held in the NORMAL APPLICATION mode position for permitting the braking pressure in the wheel cylinders 70FL, 70FR, 70RL and 70RR to be increased according to increasing of the fluid pressure built up in the master cylinder. During this period, the braking pressure in the wheel cylinders is increased as shown in FIG. 20(c). Accordingly, the wheel speed $Vw_{FL}$, $Vw_{FR}$ and $Vw_R$ is decreased.

At this time, in the shown embodiment, the front wheels are driven wheel and rear wheels are driving wheels. Therefore, due to difference of inertia moment, the deceleration rate of the front wheels $Vw_{FL}$ and $Vw_{FR}$ becomes much greater than that of the rear wheels $Vw_R$ which is illustrated by phantom line in FIG. 20(a). According to lowering of the select input $Vw_s$ from the time $t_{12}$, the comparator output $C_2$ of the comparator 66b turns into HIGH level. According to this, the gate output of the OR gate 66g turns into LOW level at a time $t_{13}$ after expiration of the predetermined period $T_3$ from the time $t_{12}$. The analog switch 66m is thus turned ON. Therefore, the input voltage E is creased at a rate of $-m$ which is a sum valve of the deceleration $X_G$ represented by the longitudinal acceleration indicative signal of the longitudinal acceleration sensor 22X and the off-set value 0.3G. Accordingly, the integrated value Ve is decreased at the rate of $-m$. By this, the projected vehicle speed representative value Vi is decreased as illustrated in FIG. 20(a). Subsequently, at a time $t_{14}$, the projected vehicle speed representative value Vi becomes substantially equal to the select input $Vw_s$, the integrated circuit 66o and the sample/hold circuit 66t are reset. Then, the instantaneous select input $Vw_s$ at the time $t_{14}$ is held in the sample/hold circuit 66t. Therefore, the sample value Vs is set constant at a value corresponding to the select input $Vw_s$ as sampled at the time $t_{14}$.

After expiration of the predetermined period $T_3$ at a time $t_{16}$, the analog switch 66n is again turned ON. Therefore, the projected vehicle speed representative value Vi is decreased at the rate of $-m$. At a time $t_{17}$, the select input $Vw_s$ drops across a wheel slippage threshold to indicate that the wheel slippage S becomes greater than or equal to the wheel slippage criterion $S_0$. As a result, the anti-skid control becomes active state and thus, the anti-skid brake control active state indicative signal MR turns into HIGH level. Therefore, the operational mode of the select circuit 64 is switched from select LOW mode to select HIGH mode. At the same time, the select switch 66p is switched from the initial position for supplying the voltage signal corresponding to +0.4G to the anti-skid active position for supplying a voltage signal corresponding to +10G. When the front-left and front-right wheel speeds $Vw_{FL}$ and $Vw_{FR}$ becomes substantially equal to the rear wheel speed $Vw_R$ at a time $t_{19}$, the integrator circuit 66o and the sample/hold circuit 66t are reset to hold the instantaneous select input $Vw_s$. Therefore, after the time $t_{19}$, the sample value Vs is held constant at a value corresponding to the instantaneous select input $Vw_s$ sampled at the time $t_{19}$. Subsequently, from a time $t_{21}$, the projected vehicle speed representative value is decreased at a rate of $-m$. During a period between times $t_{22}$ to $t_{23}$, the projected vehicle speed representative value Vi is held constant at a value corresponding to the select input $Vw_s$ held at the time $t_{22}$. During this period between the times $t_{22}$ and $t_{23}$, since the projected vehicle speed representative value Vi is maintained to be greater than or equal to $(Vw_M + 1)$, the output of the OR gate 66f turns into LOW level upon expiration of the predetermined time $T_3$. At this time, the analog switch 66m turns ON.

During the braking period set forth above, the anti-skid brake control unit 29 is active to perform anti-skid brake control. Therefore, HIGH level MR signal is supplied to a switch 66p for switching acceleration increasing rate representative value from +0.4G to +10G to be supplied to the integrator circuit 66o as the input voltage E at the time $t_{17}$. As a result, the integrated value Ve increases rapidly at the rate corresponding to +10G. When the projected vehicle speed representative data Vi becomes equal to the select input $Vw_s$ ($Vw_{FL}$) at a time $t_{24}$, the sample value Vs is held constant at a value corresponding to that held at the time $t_{24}$ until a time $t_{25}$, at which the predetermined period $T_3$ expires.

After the time $t_{25}$, the projected vehicle speed representative value Vi decreases until a time $t_{26}$, and during the period between times $t_{26}$ to $t_{28}$, the sampled value Vs is held constant at a value corresponding to that held at the time $t_{26}$. This cycle is repeated during period from $t_{28}$ to $t_{30}$ and after $t_{30}$.

In the period from $t_{12}$ to $t_{31}$, anti-skid control is performed according to the following schedule.

At the time $t_{12}$, the pressure control valve unit 71 is maintained at the NORMAL APPLICATION mode position upon initiation of the braking operation which is triggered by depression of the brake pedal 73. By application of the braking force to the brake pedal, working fluid pressure is built up in the master cylinder 72, since the pressure control valve unit 71 is held at the NORMAL APPLICATION mode position, the braking pressure in the wheel cylinder 70 is increased linearly in proportion to increasing of the working fluid pressure to decelerate the wheel speed. By increasing the braking pressure, wheel deceleration $-\alpha$(negative value of wheel acceleration) increases and becomes greater than a predetermined deceleration threshold $-\alpha_2$ at a time $t_{15}$, the anti-skid control unit 63 is responsive to the wheel deceleration increased across the deceleration threshold to initiate skid control cycle, upon which the skid control cycle enters into HOLD mode cycle period to place the pressure control valve unit 71 at the HOLD mode position to maintain the increased level of braking pressure constant. By holding the increase level of braking pressure in the HOLD mode position of the pressure control valve unit 71, the wheel is decelerated to increase wheel slippage across a predetermined wheel slippage threshold as illustrated by broken line in FIG. 20, at a time t₁₇, the anti-skid control unit 63 is responsive to increasing of the wheel slippage increasing across the wheel slippage threshold to terminal the HOLD mode cycle period and trigger RELEASE mode cycle period, in which the pressure control valve unit 71 is placed in the RELEASE mode position to decrease braking pressure in the wheel cylinder 70. By maintaining the pressure control valve unit 71 in the RELEASE mode position, braking pressure is reduced and thus wheel is accelerated to result in increasing of wheel acceleration +α across a predetermined wheel acceleration threshold +α₁ at a time t₂₀, the anti-skid control unit 63 is responsive to increasing of the wheel acceleration +α across the wheel acceleration threshold +α₁ to terminate the RELEASE mode cycle period and trigger a HOLD mode cycle period to switch the position of the pressure control valve unit 71 from the RELEASE mode position to the HOLD mode position in order to hold the braking pressure at the lowered level. By maintaining the pressure control valve unit 71 at the HOLD mode, wheel speed is resumed and increased across the vehicle body speed and subsequently return to the speed corresponding to the vehicle body speed at a time t₂₂, the anti-skid control unit 63 is responsive to the wheel speed once increased across the vehicle body speed and subsequently return to the vehicle body speed to terminate HOLD mode cycle period and trigger controlled APPLICATION mode cycle period.

The process of anti-skid brake control has been disclosed in the following U.S. Patents.

U.S. Pat. No. 4,408,290, issued on Oct. 4, 1983
U.S. Pat. No. 4,674,049, issued on Jun. 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on Jun. 16, 1987
U.S. Pat. No. 4,680,714, issued on Jul. 14, 1987
U.S. Pat. No. 4,682,295, issued on Jul. 21, 1987
U.S. Pat. No. 4,680,713, issued on Jul. 14, 1987
U.S. Pat. No. 4,669,046, issued on May 26, 1987
U.S. Pat. No. 4,669,045, issued on May 26, 1987
U.S. Pat. No. 4,679,146, issued on Jul. 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on Jun. 24, 1986
U.S. Pat. No. 4,637,663, issued on Jan. 20, 1987
U.S. Pat. No. 4,683,537, issued on Jul. 28, 1987

The disclosure of the above-identified United States Patents is herein incorporated by reference for the sake of disclosure.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 17:
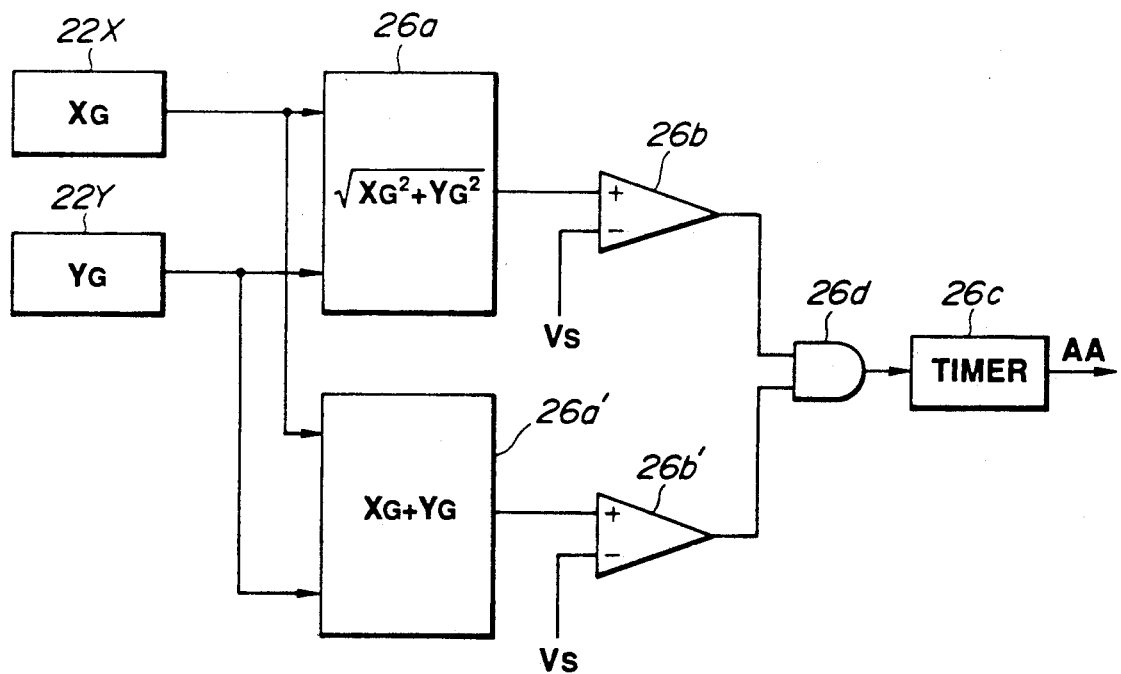
FIG. 17 is a block diagram of another embodiment of an automotive activity control system according to the invention.

For example, FIG. 17 shows another modification of the fault detector circuit 23 to be employed in the foregoing embodiment of the control system of FIG. 2. In the shown modification, another arithmetic circuit 26a' which derives a sum of the lateral acceleration indicative signal value $Y_G$ and the longitudinal acceleration indicative signal $X_G$ is disclosed. The output of the arithmetic circuit 26a' is input to a comparator 26b'. The comparator 26b' compares the output of the arithmetic circuit 26a' with the reference value Vs. Output of the comparator 26b' is input to an AND gate 26d together with the comparator output of the comparator 26b, which AND gate 26d is connected to the timer 26c for supplying the gate signal. An OR gate may be used in place of the AND gate.

In addition, though the shown embodiment is applied for the automotive vehicle having selective four wheel drive mode and rear wheel drive power train layout, the invention is, of course application for the vehicle having selective four wheel drive and front wheel drive power train layout. Also, though the shown embodiment employes wet-type clutch assembly in the transfer unit, the electromagnetic clutch may also be used for switching power train mode. Furthermore, though the shown embodiment employs the electric motor for driving the oil pump serving as the pressure source, it may be possible to use other type of power source, such as engine. Also, the pressure control valve for controlling the engaging force of the clutch assembly of the transfer unit may be replaced with a pressure reduction valve or relief valve for adjusting the engaging force.

In addition, though the specific type of anti-skid brake control system has been discussed in the shown embodiment, the invention is applicable for various constructions of the anti-skid brake control systems. For example, though the shown embodiment derives the projected vehicle speed representative value on the basis of the wheel speed, it may be possible to derive the essentially equivalent vehicle speed representative data by integrating longitudinal acceleration. Additionally, though the shown embodiment has been directed to the combination of the fourth wheel steering control system and the anti-skid brake control system, the invention may be also applicable for a combination of the four wheel steering system and a traction control system such as that disclosed in the U.S. Pat. No. 4,763,912, issued on Aug. 16, 1988.

What is claimed is:

1. A power distribution control system for an automotive vehicle, comprising:
   a power train for transmitting engine output from an internal combustion engine to a plurality of primary and secondary driving wheels, said power train including a transfer unit which selectively connects and disconnects the engine output to the secondary driving wheels for distributing a portion of the engine output to the secondary driving wheels at a controlled power distribution ratio;
   first sensor means for monitoring wheel speeds of the primary and secondary driving wheels and providing first signals indicative thereof;
   second sensor means for monitoring a longitudinal acceleration acting on a body of said vehicle and providing a second signal indicative thereof;
   vehicle speed projecting means, responsive to the first and second signals from the first and second sensor means, for projecting a vehicle speed based on a preselected one of the wheel speeds of the primary and secondary wheels and the longitudinal acceleration acting on the body of said vehicle and providing a third signal indicative thereof, the vehicle speed varying with a variation defined by the longitudinal acceleration;

power distribution ratio determining means responsive to the third signal from said vehicle speed projecting means, for determinating a first power distribution ratio of the engine output power to the secondary driving wheels in a first preselected relation to the projected vehicle speed and providing a fourth signal indicative thereof; and controlling means, responsive to the fourth signal from said power distribution ratio determining means, for controlling the transfer unit to distribute the engine output power to the secondary driving wheels at the first power distribution ratio determined by said power distribution determining means.

2. A power distribution control system as set forth in claim 1, further comprising second power distribution ratio determining means, responsive to the first signal from said first sensor means, for determining a second power distribution ratio of the engine output power to the secondary driving wheels in a second preselected relation to a wheel speed difference between the primary and secondary driving wheels and providing a fifth signal indicative thereof, and wherein said controlling means controls the transfer unit based on either said first power distribution ratio or said second power distribution ratio.

3. A power distribution control system as set forth in claim 2, wherein said controlling means selects the greater of the first and second power distribution ratios to the secondary driving wheels and distributes the engine output power to the secondary driving wheels at the greater of the first and second power distribution ratios.

4. A power distribution control system as set forth in claim 1, wherein said vehicle speed projecting means integrates the longitudinal acceleration monitored by said second sensor means over time to provide an integrated value defining the variation of the vehicle speed, said vehicle speed projecting means projecting the vehicle speed based on the integrated value and a value of the preselected one of the wheel speeds of the primary and secondary driving wheels.

5. A power distribution control system as set forth in claim 4, wherein said vehicle speed projecting means is reponsive to an agreement of values of the projected vehicle speed and the preselected one of the wheel speeds while the projected vehicle speed holds the value of the projected vehicle speed for a preselected time without any variation.

6. A power distribution control system as set forth in claim 5, where said vehicle speed projecting means selects the lower speed of the wheel speeds of the primary and secondary driving wheels as teh preselected one of the wheels speeds, when the vehicle accelerates and selects the highest speed of the wheel speeds as the preselected one of the wheel speeds, when the vehicle decelerates.

7. A power distribution control system as set forth in claim 6, further comprising an anti-skid control means for controlling a braking force applied to the primary and secondary driving wheels to maintain wheel slippage at a predetermined optimal level, said vehicle speed projecting means selecting the highest speed of the wheel speeds of the primary and secondary driving wheels as the preselected one of the wheel speeds during said anti-skid control.

8. A power distribution control system as set forth in claim 7, wherein said vehicle speed projecting means provides the variation of the projected vehicle speed defined by a preselected constant negative value when the highest speed of the wheel speeds exceeds the projected vehicle speed during said anti-skid control so that the projected vehicle speed coincides with the highest speed.

9. A power distribution control system as set forth in claim 1, further comprising a third sensor means for monitoring a lateral acceleration acting on the vehicle body to provide a sixth signal indicative thereof, said power distribution ratio determining means being responsive to the signal from said third sensor means for modifying the first power distribution ratio for the secondary wheels to a ratio smaller by a preselected value.

10. A power distribution control system as set forth in claim 2, further comprising a third sensor means for monitoring a lateral acceleration acting on the vehicle body to provide a seventh signal indicative thereof, said second power distribution ratio determining means being responsive to the seventh signal from said third sensor means for modifying the second power distribution ratio for the secondary wheels to a ratio smaller by a preselected value.

11. A power distribution control system as set forth in claim 1, wherein said vehicle speed projecting means inlcudes an off-set means for offsetting the longitudinal acceleration monitored by said second sensor means by a preselected value and projects the vehicle speed which vaires with variation defined by the preselected value.

12. A power distribution control system as set forth in claim 7, further comprising an engine braking force determining means which includes an engine speed sensor monitoring an engine speed for detemining engine braking force applied to the wheels and providing an eighth signal indicative thereof, said power distribution ratio determining means being responsive to the eighth signal from said engine braking force determining means determinig a power distribution ratio to the secondary wheels in a second preselected relation to the maginitude of the braking force during the anti-skid control in place of the first power distribution ratio determined based on the project vehicle speed.

13. A power distribution control system as set forth in claim 2, further comprising an anti-skid control means for controlling a braking force applied to the primary and secondary driving wheels to maintain wheel slippage at a predetermined optimal level and engine braking force determining means which includes an engine speed sensor monitoring an engine speed for determining engine braking force applied to the wheels and provinding a ninth signal indicative thereof, said second power distribution ratio detemining means being responsive to the ninth signal from said engine braking force determining means determining a power distribution ratio to the secondary wheels in a third preselected relation to the magnitude of the braking force during the anti-skid control in place of the second power distribution ratio determined based on the projected vehicle speed.

14. A power distribution control system as set forth in claim 1, further comprising a fail-safe means which includes a failure detecting means for detecting failure of the system to provide a tenth signal indicative thereof, said power distribution ratio determining means being responsive to the tenth signal from said failure detecting means to determine a power distribution ratio of the engine output power to the secondary driving wheels instead of the first power distribution ratio based on the projected vehicle speed so that power distribution to the secondary driving wheels is decreased with a preselected variation.

15. In a combination of an anti-skid contol system and a power distribution control system for an automotive vehicle, said anti-skid control system comprising:

first detecting means for detecting wheel speed of a primary and a secondary driving wheel and providing a first signal indicative thereof;

second detecting means for detecting a longitudinal acceleration acting on a vehicle body and providing a second signal indicative thereof;

vehicle speed projecting means, responsive to the first and second signals from said first and second detecting means, for projecting a vehicle speed based on a preselected one of the wheel speeds of the primary and secondary driving wheels and the longitudinal acceleration to provide a third signal indicative thereof, the vehicle speed varying with a variation defined by the longitudinal acceleration;

wheel slippage determining means, responsive to the first, second and third signals from said first detecting means, second detecting means and said vehicle speed projecting means respectively, for detemining a wheel slippage based on the wheel speeds and the projected vehicle speed to provide a fourth signal indicative thereof; and braking means for controlling a braking force applied to a plurality of braking units which are associated with the primary an secondary driving wheels based on the wheel slippage determined by said wheel slippage determining means to maintain the wheel slippage at a predetermined optimal level, and said power distribution control system comprising:

a power train for transmitting engine output from an internal combustion engine to the primary and secondary driving wheels, the power train including a transfer unit which selectively connects and disconnects the engine output to the secondary driving wheels to distribute a portion of the engine output to the secondary driving wheels at a controlled power distribution ratio;

power distribution ratio determining means, responsive to the third signal from said vehicle speed projecting means, for determining a first power distribution ratio of the engine output power to the secondary driving wheels in a first preselected relation to the projected vehicle speed and providing a fifth signal indicative thereof; and controlling means, responsive to the fifth signal from said power distribution ratio determining means, for controlling the transfer unit to distribute the engine output power to the secondary driving wheels at the first power distribution ratio determined by said power distribution determining means.

16. A power distribution control system as set forth in claim 15, wherein said wheel slippage determining means, responsive to the first signal from said first sensor means, for determining wheel slippage and providing a sixth signal indicative thereof and further comprising a second power distribution ratio determining means, responsive to the sixth signal from said wheel slippage determining means, for determining a second power distribution ratio of the engine output power to the secondary driving wheels, in a second preselected realtion to the amount of wheel slippage, and providing a seventh signal indicative thereof, said controlling means controlling the transfer unit based on one of the first and second power distribution ratios determined by said power distribution ratio determining means and said second power distribution ratio determining means.

17. A power distribution control system as set forth in claim 16, wherein said controlling means selects the greater of the first and second power distribution ratios to the secondary driving wheels determined by said power distribution ratio determining means and said further comprising a second power distribution ratio determining means to distribute the engine output power to the secondary driving wheels at the greater of the first and second power distribution ratios.

* * * * *